(12) United States Patent
Hosokawa et al.

(10) Patent No.: US 10,457,162 B2
(45) Date of Patent: Oct. 29, 2019

(54) VEHICULAR OCCUPANT DETERMINATION APPARATUS

(71) Applicants: DENSO CORPORATION, Kariya, Aichi-pref. (JP); HONDA MOTOR CO., LTD., Minato-ku, Tokyo (JP)

(72) Inventors: Toshio Hosokawa, Kariya (JP); Yusuke Muramatsu, Wako (JP)

(73) Assignees: DENSO CORPORATION, Kariya, Aichi-pref. (JP); HONDA MOTOR CO., LTD, Minato-ku, Tokyo (JP)

( * ) Notice: Subject to any disclaimer, the term of this patent is extended or adjusted under 35 U.S.C. 154(b) by 235 days.

(21) Appl. No.: 15/189,608

(22) Filed: Jun. 22, 2016

(65) Prior Publication Data
US 2016/0375797 A1    Dec. 29, 2016

(30) Foreign Application Priority Data
Jun. 24, 2015    (JP) .................. 2015-126422

(51) Int. Cl.
*B60N 2/00*    (2006.01)

(52) U.S. Cl.
CPC .................. *B60N 2/002* (2013.01)

(58) Field of Classification Search
CPC combination set(s) only.
See application file for complete search history.

(56) References Cited

U.S. PATENT DOCUMENTS

| 7,444,218 B2 * | 10/2008 | Ueno | .................. B60R 21/0132 |
| | | | 701/45 |
| 2004/0045759 A1 | 3/2004 | Kiribayashi | |

(Continued)

FOREIGN PATENT DOCUMENTS

| JP | H06-171386 | 12/1992 |
| JP | 2000-302003 A | 10/2000 |

(Continued)

OTHER PUBLICATIONS

U.S. Appl. No. 15/189,729, filed Jun. 22, 2016, Hosokawa et al., JP 2015-126424.

*Primary Examiner* — Adam D Tissot
*Assistant Examiner* — Edward J Pipala
(74) *Attorney, Agent, or Firm* — Knobbe, Martens, Olson & Bear, LLP

(57) ABSTRACT

A vehicular occupant determination apparatus includes a load detection portion, an occupant determination portion, an acceleration detection portion, a transition prohibition portion, a drive state detection portion, and a prohibition release portion. The load detection portion detects a load of a left part or a right part. The occupant determination portion determines occupant types, and maintains or transits a determination result. The transition prohibition portion sets a transition prohibition state when the acceleration is equal to or greater than a predetermined acceleration threshold. The prohibition release portion sets a prohibition release state when (i) the acceleration is equal to or greater than the acceleration threshold, and (ii) the prohibition release portion detects that the vehicle is in stop based on a detection value detected by the drive state detection portion, the transition prohibition state being released during the prohibition release state.

14 Claims, 16 Drawing Sheets

(56) References Cited

U.S. PATENT DOCUMENTS

| | | | | |
|---|---|---|---|---|
| 2005/0131605 A1* | 6/2005 | Nakamoto | ........ | B60R 21/01516 |
| | | | | 701/45 |
| 2012/0312604 A1 | 12/2012 | Fujii | | |
| 2015/0166000 A1 | 6/2015 | Honda et al. | | |

FOREIGN PATENT DOCUMENTS

| JP | 3726276 B2 | 12/2005 |
|---|---|---|
| JP | 2012-206697 | 10/2012 |

* cited by examiner

VEHICULAR OCCUPANT DETERMINATION APPARATUS

CROSS REFERENCE TO RELATED APPLICATION

This application is based on Japanese Patent Application No. 2015-126422 filed on Jun. 24, 2015, the disclosure of which is incorporated herein by reference.

TECHNICAL FIELD

The present disclosure relates to a vehicular occupant determination apparatus that determines an occupant type on a vehicle seat.

BACKGROUND

Patent literature 1: JP 2013-001152 A (corresponding to US 2012/0312604 A1)

For example, Patent literature 1 discloses a vehicular occupant determination apparatus which determines a type of an occupant on a vehicle seat in order to operate an occupant protection apparatus such as an airbag apparatus, a seatbelt pre-tensioner. In order to determine whether the occupant protection apparatus operates or not, this kind of the occupant determination apparatus determines which situations including a case where (i) there is nothing on a vehicle seat (also, referred to as a vacant seat, or vacant), (ii) a child restraint system (also referred to as CRS or a car seat) is fixed, (iii) a small-sized adult has a seat, or (iv) a large-sized adult has a seat. Hereinafter, by including the above situations regarding the vehicle seat determined by the occupant determination apparatus, the situations are named as an occupant type (also referred to as a type of an occupant).

In an occupant determination apparatus disclosed conventionally, a pair of front and rear load sensors is provided at a left-side support portion of the vehicle seat. In addition, the occupant determination apparatus determines the occupant type only when a detection value of an acceleration sensor which detects an acceleration of a lateral direction (also referred to as a vehicle width direction or a width direction of a vehicle) of a vehicle is equal to or less than a predetermined threshold. That is, the occupant type is not determined in a vehicle when the acceleration in the vehicle width direction exceeds the threshold. An occupant position or an occupant posture on the vehicle seat may change when acceleration occurs in the vehicle width direction according to a turning driving of the vehicle or the like. In this case, although the occupant type on the vehicular sheet has not changed, it may be determined that the occupant type has changed. In a conventional occupant determination apparatus, it may be possible to erroneously determine the occupant type due to the acceleration generated in the vehicle width direction.

The inventors of the present application have found the following regarding the conventional occupant determination apparatus. According to the conventional occupant determination apparatus, the determination of the occupant type is not performed when the acceleration in the vehicle width direction exceeds the threshold value. Thus, when the occupant type on the vehicle seat has changed in actual, the determination of the occupant type may be delayed. Especially, it is supposed that an adult sits on a vehicle seat which has been vacant when the vehicle stops at a road inclined in the vehicle width direction. In this case, the determination of a vacant seat state may remain before the vehicle drives and travels a flat road.

SUMMARY

It is an object of the present disclosure to provide a vehicular occupant determination apparatus that correctly determines an occupant type on a vehicle seat even when acceleration occurs in a vehicle width direction.

According to one aspect of the present disclosure, a vehicular occupant determination apparatus comprising: a load detection portion that detects a load of either a left part or a right part of a seat portion of a vehicle seat in a vehicle; an occupant determination portion that determines any one of occupant types on the vehicle seat based on the load detected by the load detection portion, and maintains or transits a determination result of the occupant types; an acceleration detection portion that detects an acceleration in a width direction of the vehicle, the acceleration being generated in the vehicle; a transition prohibition portion that sets a transition prohibition state when the acceleration is equal to or greater than a predetermined acceleration threshold, wherein the determination result of the occupant types is prohibited from transiting during the transition prohibition state; a drive state detection portion that detects a drive state of the vehicle; and a prohibition release portion that sets a prohibition release state when (i) the acceleration is equal to or greater than the acceleration threshold, and (ii) the prohibition release portion detects that the vehicle is in stop based on a detection value detected by the drive state detection portion, wherein the transition prohibition state is released during the prohibition release state.

According to this configuration, the transition prohibition portion sets the transition prohibition state which prohibits a transition of the determination result of the occupant type determined by the occupant determination portion when an acceleration detected by the acceleration detection portion is equal to or greater than a predetermined acceleration threshold. Accordingly, when a vehicle drives in turning, the transition prohibition portion sets the transition prohibition state. Thus, it may be possible to prevent an erroneous determination that the occupant type has changed, even when the occupant position or the occupant posture has changed on the vehicle seat. In addition, the vehicular occupant determination apparatus is provided with the prohibition release portion that sets the prohibition release state. In the prohibition release portion, the transition prohibition state is released when it is detected that an acceleration detected by the acceleration detection apparatus is equal to or greater than an acceleration threshold and also when it is detected, based on a detection value detected by the drive state detection portion, that the vehicle stops. Accordingly, the prohibition release portion releases the transition prohibition state when the vehicle stops inclined in the vehicle width direction. Thus, it may be possible to detect a change of the occupant type when an occupant sits on or leave the vehicle seat, and to prevent a determination result which is greatly different from the actual occupant type.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment (Configuration of Vehicle Seat)

Embodiment of the present disclosure will be explained. In the present disclosure, a case where the detected acceleration is equal to or greater than a predetermined acceleration threshold includes a case where a positive value of the detected acceleration is equal to or greater than a positive value of the acceleration threshold and a case where a negative value of the detected acceleration is equal to or less than a negative value of the acceleration threshold, when the acceleration is distinguished to a positive value and a negative value according to a direction. In other words, a case where the detected acceleration is equal to or greater than a predetermined acceleration threshold includes an absolute value of the detected acceleration is equal to or greater than an absolute value of the accelerated threshold.

Furthermore, the drive state of the vehicle detected by the drive state detection portion includes a stop state of the vehicle.

A configuration of a vehicle seat 9 of the present embodiment will be explained with reference to FIG. 1. The vehicle seat 9 is mounted to a vehicle VE. In the present application, an occupant type includes concepts of (i) whether or not an occupant BH exists on the vehicle seat 9, (ii) whether or not a child restraint system (CRS) is fixed to the vehicle seat 9, and (iii) an occupant BH on the vehicle seat 9. The occupant type may also be referred to as a type of an occupant. An example of the occupant BH is shown in FIG. 3A to FIG. 3D. Also, in the explanation, a front for the occupant BH sitting on the vehicle seat 9 represents a front direction (shown as an arrow in FIG. 1) of the vehicle seat 9. In addition, in the explanation, a right direction when an occupant sits on the vehicle seat 9 and looks at the arrow direction (that is, the front direction) in FIG. 1 corresponds to a right direction. And, a left direction corresponds to the direction opposite to the right direction. An explanation will be provided as if the vehicle seat 9 is a seat for a passenger seat in a right-hand drive vehicle. The present disclosure is not limited to the right-hand drive vehicle. The vehicular occupant determination apparatus 1 (referred to as an occupant determination apparatus 1) in the present disclosure may be applied to a seat for a passenger seat in a left-hand drive vehicle. Further, the vehicular occupant determination apparatus 1 may be applied to any vehicle seat other than the seat for the passenger seat.

Figure 1:
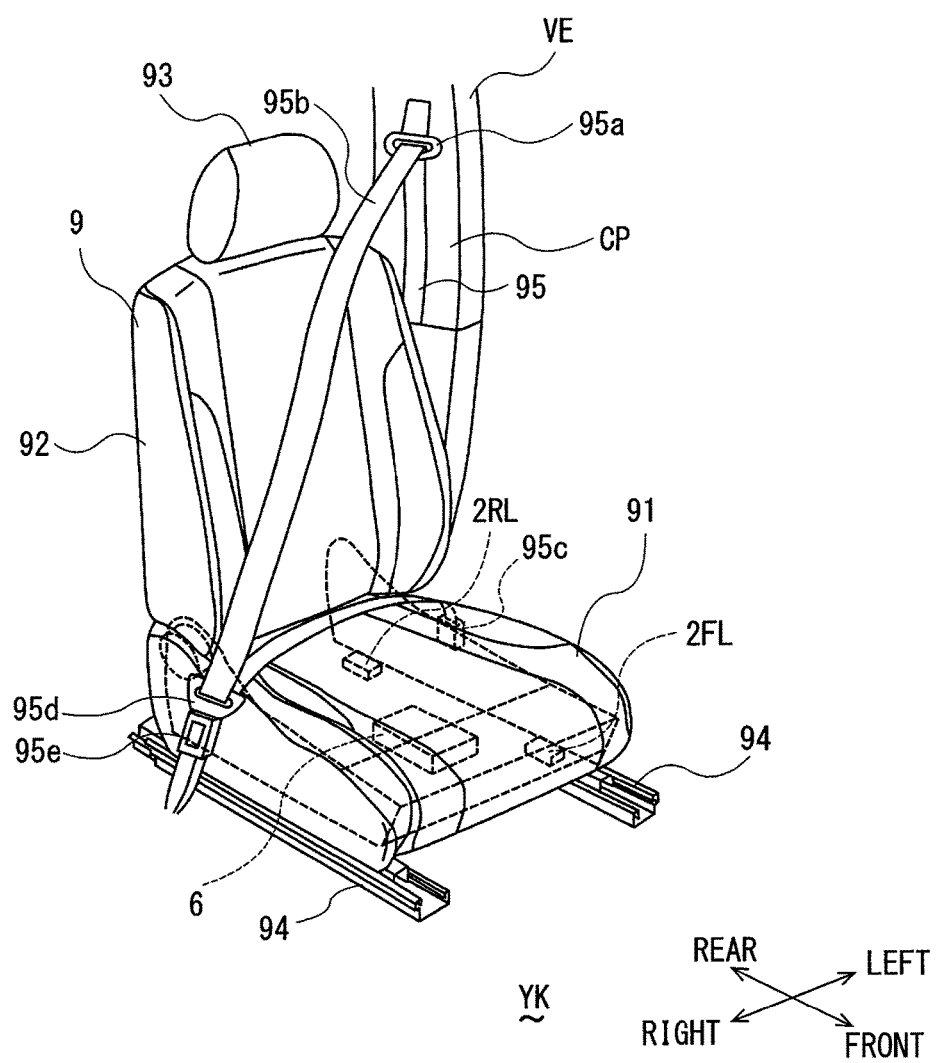
FIG. 1 is a perspective view of a vehicle seat which an occupant type on is determined using a vehicular occupant determination apparatus of an embodiment.

As illustrated in FIG. 1, the vehicle seat 9 for the passenger seat is mounted to the right-hand drive vehicle. The vehicle seat 9 includes a seat cushion 91 (corresponding to a seat portion) where an occupant has a seat, and a seat back 92 which is attached rotatably at a rear end of the seat cushion 91 in a front and rear direction, and provides a back support for the occupant BH. A head rest 93 which supports a head of the occupant BH is attached at the upper end of the seat back 92. A pair of left and right lower rails 94 is fixed on a floor YK of the vehicle VE. The seat cushion 91 is engaged to the lower rails 94 movably in the front and rear direction.

In the present embodiment, a seatbelt apparatus 95 provided to the vehicle seat 9 is a conventional three-point seatbelt. However, the present disclosure is not limited to a three-point seatbelt. The seatbelt apparatus 95 includes a through anchor 95a which is swingably attached above a center pillar CP of the vehicle VE. A webbing 95b is movably inserted in the through anchor 95a. An outer anchor 95c is fixed to the floor YK so as to be located at the left of the seat cushion 91. One end of the webbing 95b is connected to the outer anchor 95c. The other end of the webbing 95b is drawn into the center pillar CP, and is linked to a retractor (not shown) in the center pillar CP. The webbing 95b is inserted in a tongue plate 95d. The tongue plate 95d is provided to be engageable and demountable with respect to a buckle 95e which is placed at the right of the seat cushion 91. Thus, the seatbelt apparatus 95 is provided so that the occupant BH or CRS is fixed on the vehicle seat 9 with the webbing 95b by engaging the tongue plate 95d to the buckle 95e.

A load sensor 2FL and a load sensor 2RL are attached to the left part of the seat cushion 91. Each of the load sensor 2FL and the load sensor 2RL corresponds to a load detection portion or a load detector. Hereinafter, a load sensor 2FL, 2RL represents the load sensor 2FL and the load sensor 2RL. A pair of the load sensor 2FL, 2RL is attached to a front part and a rear part in the lower part of the seat cushion 91, respectively. That is, the load sensor 2FL is attached to the front part under the seat cushion 91, and the load sensor 2RL is attached to the rear part under the seat cushion 91. The load sensor 2FL, 2RL is formed by a strain gage or the like. The load sensor 2FL, 2RL detects loads W1, W2 that the left part of the seat cushion 91 receives among the load generated by an occupant seating, an attachment of CRS, a loading of a baggage or the like to the vehicle seat 9. The load sensor 2FL detects the load W1. The load sensor 2RL detects the load W2. The load sensor 2FL, 2RL may be attached to the right part of the seat cushion 91. Incidentally, the present disclosure does not limit a class, a type, a detection principle of the load sensor 2FL, 2RL to a specific one.

An occupant detection ECU 6 is placed under the seat cushion 91. The detail of the occupant detection ECU 6 will be explained later.

(Outline Configuration and Function of Vehicular Occupant Determination Apparatus)

An outline configuration of the occupant determination apparatus 1 will be explained with reference to FIG. 2.

An acceleration sensor 3 is formed by an electrostatic capacitance type acceleration sensor, a piezoresistance type acceleration sensor, an acceleration sensor of a heat detection type, or the like. The acceleration sensor 3 detects acceleration GL which is generated in a lateral direction in the vehicle VE. The lateral direction in the vehicle VE may also be referred to as the vehicle width direction. The acceleration sensor 3 corresponds to an acceleration detection portion or an acceleration detector.

A wheel speed sensor 4FR, a wheel speed sensor 4FL, a wheel speed sensor 4RR, and a wheel speed sensor 4RL each is attached to each of the four wheels (not shown) of the vehicle VE. Each of the wheel speed sensor 4FR, the wheel speed sensor 4FL, the wheel speed sensor 4RR, and the wheel speed sensor 4RL may be an example of a drive state detection portion or a drive state detector which detect a drive state of a vehicle. Hereinafter, a wheel speed sensor 4FR, 4FL, 4RR, 4RL represents the wheel speed sensor 4FR, the wheel speed sensor 4FL, the wheel speed sensor 4RR, and the wheel speed sensor 4RL. The wheel speed sensors 4FR, 4FL, 4RR, 4RL, respectively detect the rotation speeds V1, V2, V3, V4 of the four wheels, so as to detect the speed of the vehicle VE. Instead of the wheel speed sensor 4FR, 4FL, 4RR, 4RL, a device which detects a rotation speed of an output shaft of a transmission (not shown) of the vehicle VE or a shift position switch which indicates that the transmission is set to a P (parking) range may be used as the drive state detection portion. Furthermore, either or both a foot brake switch which detects an operation of a foot brake or a parking brake switch which detects an operation of a parking brake may be used the drive state detection portion.

A buckle switch 5 is placed within the buckle 95e. In order to detect wearing of the seatbelt apparatus 95 by an occupant, the buckle switch 5 detects an engagement state of the tongue plate 95d and the buckle 95e, and whether the tongue plate 95d and the buckle 95e are engaged to each other or not. The buckle switch 5 sends a buckle signal BSW which indicates whether the tongue plate 95d and the buckle 95e are engaged.

The load sensor 2FL, 2RL, the acceleration sensor 3, the wheel speed sensor 4FR, 4FL, 4RR, 4RL, and the buckle switch 5 are connected to the occupant detection ECU 6. The occupant detection ECU 6 is a control apparatus which includes an input-and-output device, CPU, RAM, or the like (not shown). The occupant detection ECU 6 includes an occupant determination portion 61 (also referred to as an occupant determiner), a transition prohibition portion 62 (also referred to as a transition prohibition), and a prohibition release portion 63 (also referred to as a prohibition releaser). The occupant detection ECU 6 will be explained in detail.

The occupant determination portion 61 is connected to the load sensor 2FL, 2RL. The occupant determination portion 61 calculates the sum (W=W1+W2) of the load W1, which is detected by the load sensor 2FL, and the load W2, which is detected by the load sensor 2RL. Incidentally, the load W may be an average of the load W1 and the load W2. The load W includes and represents a load W(0) mentioned later, a load W(+GL), and a load W(−GL). The occupant determination portion 61 determines which of the multiple occupant types, based on the calculated load W. The occupant types are determined in advance and represent an occupant type on the vehicle seat 9. The occupant determination portion 61 maintains the present determination result of the occupant type, or transits to a newly determined determination result of the occupant type from the present determination result of the occupant type, each time when determining the occupant type on the vehicle seat 9. Incidentally, the present determination result represents a determination result which is a determination result of the occupant type before transition and is presently recognized by the occupant determination portion 61. The newly determined determination result may be referred to as a determination result of the occupant type of a transition destination.

Figure 3A:
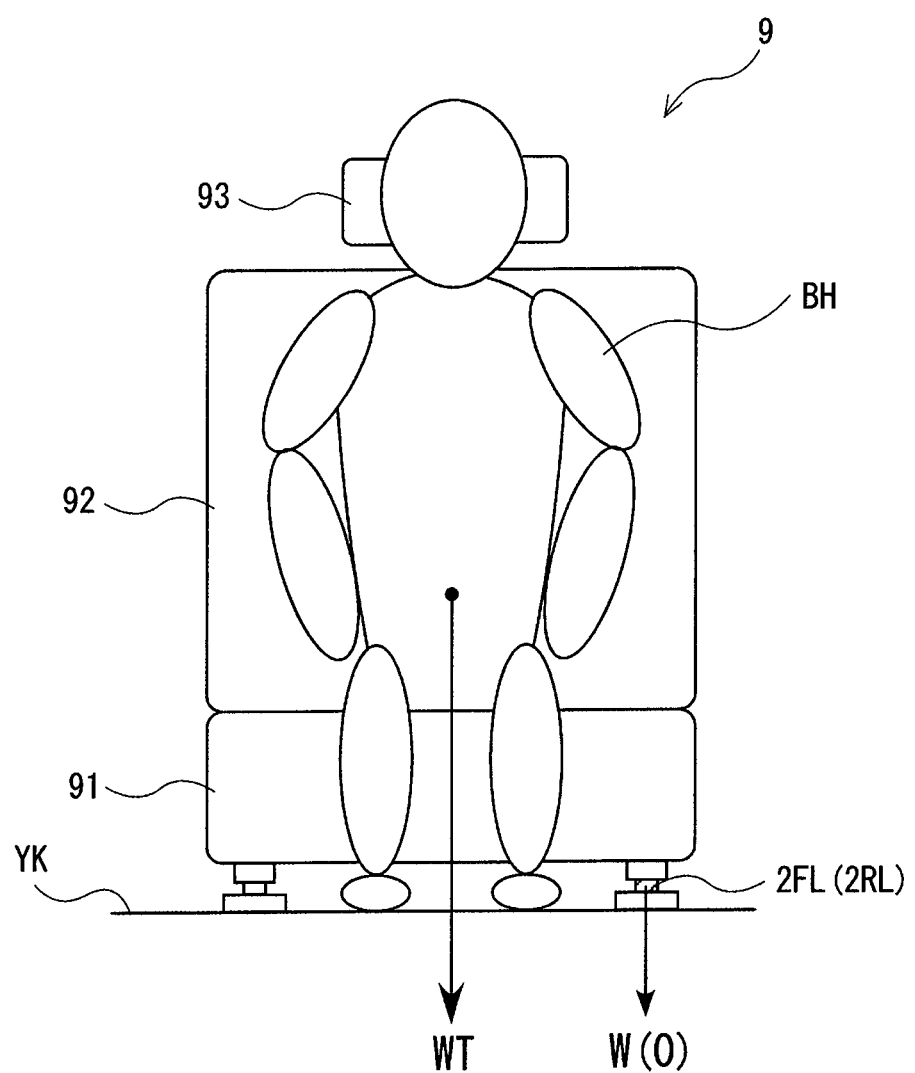
FIG. 3A is an elevation view schematically illustrating a condition where an occupant exists on the vehicle seat illustrated in FIG. 1 and an acceleration does not occur in the vehicle width direction.

As illustrated in FIG. 3A, the load sensor 2FL, 2RL detects the load W(0) which is received by the left portion of the seat cushion 91 when an acceleration GL in the vehicle width reaction does not occur to vehicle seat 9. The load W(0) is generated from the weight WT of the occupant BH. The acceleration GL in the vehicle width reaction is simply referred to as acceleration GL. The load W(0) is equal to the sum of the load W1, which is detected by the load sensor 2FL, and the load W2, which is detected by the load sensor 2RL.

Figure 3B:
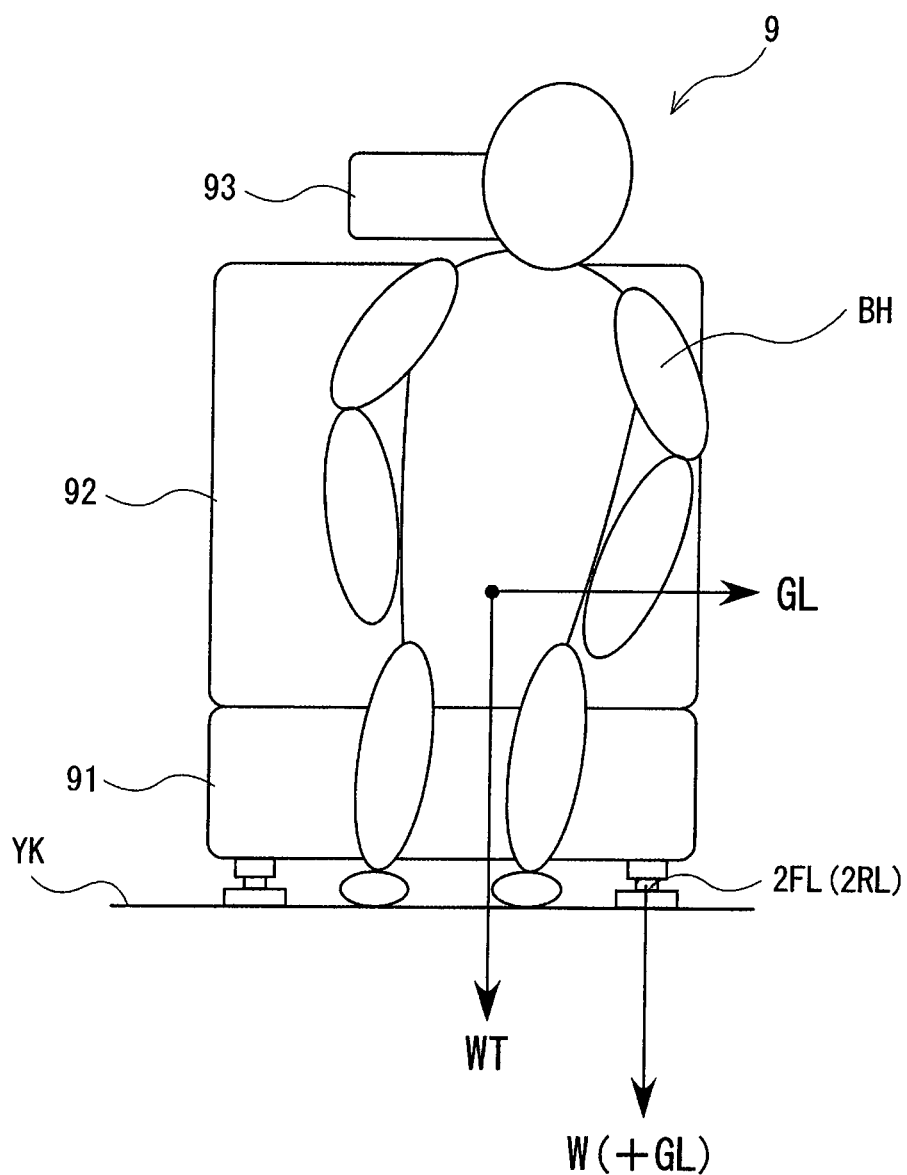
FIG. 3B is an elevation view schematically illustrating a condition where the acceleration to the vehicle seat of FIG. 3A occurs in the vehicle width direction.

By contrast, as illustrated in FIG. 3B, the load sensor 2FL, 2RL detects the load W(+GL) when the acceleration GL has occurred in the left direction by turning driving or the like of the vehicle VE with respect to the vehicle seat 9 where the occupant BH exists. The load W(+GL) is equal to the sum of the load W1 and the load W2 in this case. Incidentally, the load W(+GL) is greater than the load W(0), which is detected when the acceleration GL does not occur in the vehicle seat 9, (W(+GL)>W(0)).

Figure 3C:
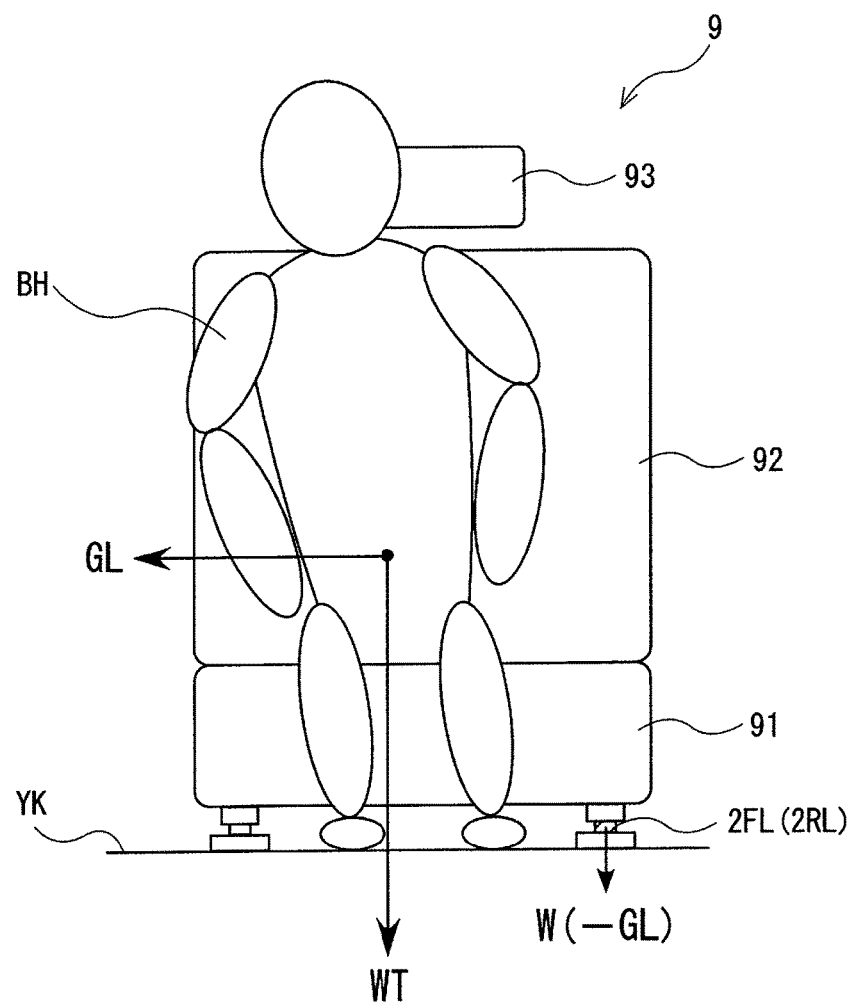
FIG. 3C is an elevation view schematically illustrating a condition where an acceleration occurs in an opposed direction of the acceleration illustrated in FIG. 3B in the vehicle seat.

As illustrated in FIG. 3C, when the acceleration GL occurs in the right direction with respect to the vehicle seat 9, the load sensor 2FL, 2RL detects the load W(−GL). The load W(−GL) is equal to the sum of the load W1 and the load W2 in this case. The load W(−GL) is smaller than the load W(0), (that is, W(−GL)<W(0)).

Figure 3D:
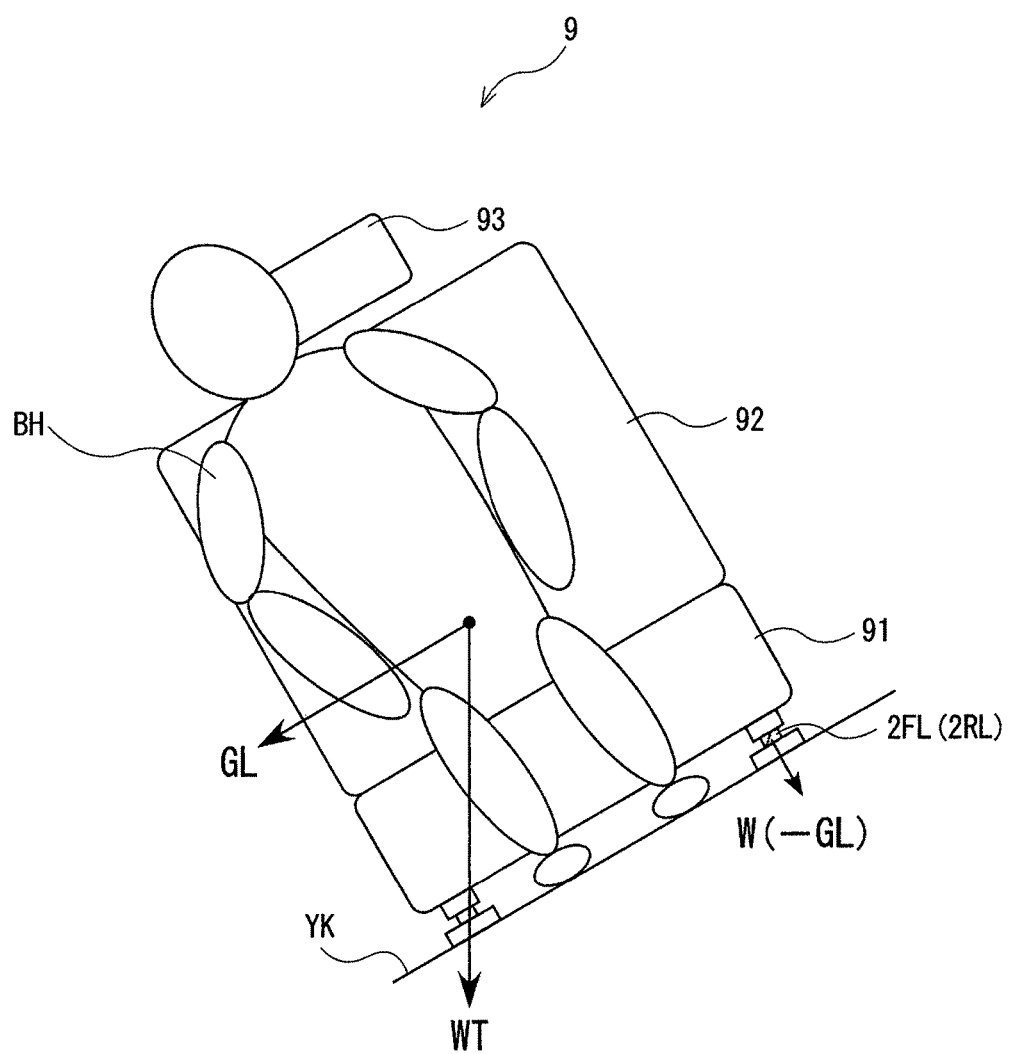
FIG. 3D is an elevation view schematically illustrating a condition that the vehicle seat is inclined.

Furthermore, as illustrated in FIG. 3D, when the vehicle seat 9 on which the occupant BH exists inclines to the right direction, the load sensor 2FL, 2RL detects the load W(−GL) that is smaller than the load W(0), as similar to the case illustrated in FIG. 3C. Incidentally, although the load W(−GL), which is generated in this case, and the load W(−GL) that occurs in the case illustrated in FIG. 3C have the identical numerals, it is not necessary that both loads W(−GL) are equal to each other.

Furthermore, although it is not shown in the drawings, when the vehicle seat 9 on which the occupant BH exists inclines to the left direction, the load sensor 2FL, 2RL detects the load W(+GL) that is greater than the load W(0), as similar to the case illustrated in FIG. 3B. Incidentally, the load W(+GL) which occurs in this case, and the load W(+GL) which occurs in the case illustrated in FIG. 3B have the identical numerals. However, it is not necessary that both loads W(+GL) are equal to each other.

Figure 4:
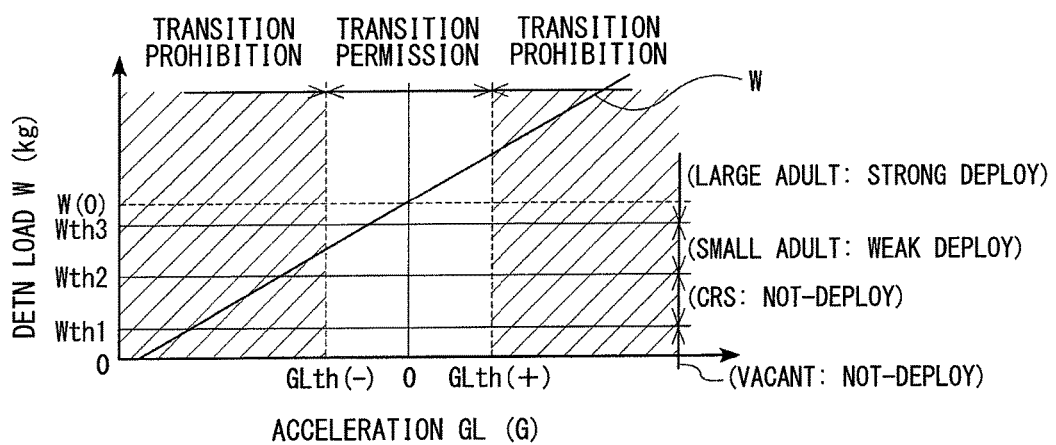
FIG. 4 is a diagram illustrating a map showing correlation between a detection load and acceleration determining an occupant type.

The occupant determination portion 61 uses a map illustrated in FIG. 4, and determines the occupant type on the vehicle seat 9 based on the detected load W. Specifically, when the load W is less than a first load threshold Wth1, it is determined that the vehicle seat 9 is vacant (also referred to as a vacant seat). When the load W is equal to or greater than the first load threshold Wth1 and also is less than a second load threshold Wth2, it is determined that CRS is fixed on the vehicle seat 9. When the load W is equal to or greater than the second load threshold Wth2 and also is less than a third load threshold Wth3, it is determined that a small-sized adult sits on the vehicle seat 9. Incidentally, the small-sized adult may be referred to as a small adult in FIG. 4, FIG. 5A, and thereafter. When the load W is equal to or greater than the third load threshold Wth3, it is determined that a large-sized adult sits on the vehicle seat 9. The large-sized adult may be referred to as a large adult in FIG. 4, FIG. 5A, and thereafter. Incidentally, it should be noticed that the determination method of the occupant type explained above is an example. Any other determination method may be applicable when the present disclosure is performed. Incidentally, the small-sized adult and the large-sized adult may be referred to an adult together.

Figure 2:
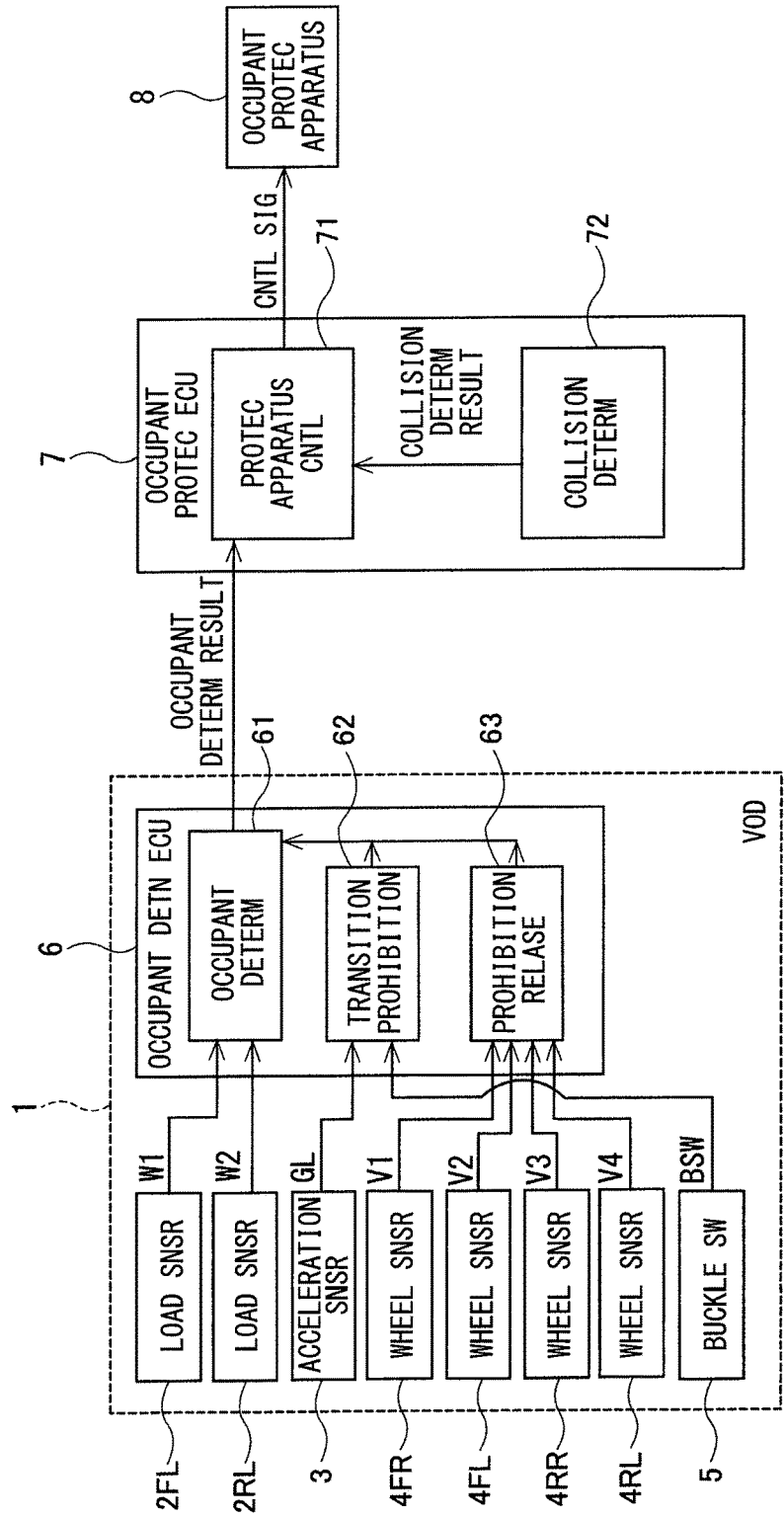
FIG. 2 is a block diagram of the vehicular occupant determination apparatus connected with an occupant protection ECU.

As described in FIG. 2, the transition prohibition portion 62 is connected with the acceleration sensor 3. The transition prohibition portion 62 compares the acceleration GL detected by the acceleration sensor 3 with a predetermined left-direction acceleration threshold GLth(+) or a predetermined right-direction acceleration threshold GLth(−). Incidentally, in FIG. 4, a left-direction acceleration GL is expressed as a positive value, and a right-direction acceleration GL is expressed as a negative value. The left-direction acceleration threshold GLth(+) is a comparative threshold at the time when the detected acceleration GL is the acceleration to the left direction. The right-direction acceleration threshold GLth(−) is a comparative threshold at the time when the detected acceleration GL is the acceleration to the right direction. Hereinafter, by covering the left-direction acceleration threshold GLth(+) and the right-direction acceleration threshold GLth(−), these acceleration thresholds may be referred to as acceleration threshold GLth(+), GLth(−). That is, the acceleration threshold GLth(+), GLth(−) may represent the left-direction acceleration threshold GLth(+) and the right-direction acceleration threshold GLth(−). The transition prohibition portion 62 sets a transition prohibition state when the detected positive value of the acceleration GL is equal to or greater than the left-direction acceleration threshold GLth(+) or when the detected negative value of the acceleration GL is equal to or less than the right-direction acceleration threshold GLth(−). In the transition prohibition state, the occupant determination portion 61 is prohibited from transiting the determination result of the occupant type. In FIG. 4, a region corresponding to the transition prohibition state is illustrated by hatching. Incidentally, an absolute value of the acceleration GL when the detected positive value of the acceleration GL is equal to or greater than the left-direction acceleration threshold GLth(+) or when the detected negative acceleration GL is equal to or less than the detected acceleration GLth(−) is equal to or greater than the acceleration threshold GLth(+), GLth(−). Therefore, the both cases correspond to a case where the acceleration is equal to or greater than the acceleration threshold.

The prohibition release portion 63 is connected with the wheel speed sensor 4FR, 4FL, 4RR, 4RL. The prohibition release portion 63 detects that the vehicle VE stops, based on the rotation speeds V1, V2, V3, V4 of the four wheels detected by the wheel speed sensors 4FR, 4FL, 4RR, 4RL. Incidentally, the rotation speeds V1, V2, V3, V4 may be referred to as a wheel speed. A case where the vehicle stops may be referred to as a stop state of the vehicle VE, or a vehicle stop state. A method which detects whether the vehicle VE stops or not based on the detection values of the wheel speed sensor 4FR, 4FL, 4RR, 4RL will be described below. The method to detect whether the vehicle VE stops or not may be referred to as a vehicle state determination process. The prohibition release portion 63 sets a prohibition release state upon being determined that the vehicle VE stop when the positive value of the acceleration GL, which is detected by the acceleration sensor 3, is equal to or greater than the left-direction acceleration threshold GLth(+) or when the detected negative value of the acceleration GL is equal to or less than the right-direction acceleration threshold GLth(−). In the prohibition release state, the transition prohibition state set by the transition prohibition portion 62 is released.

The transition prohibition portion 62 is connected with the buckle switch 5. It is supposed that the occupant determination portion 61 is in the prohibition release state. In this case, the transition prohibition portion 62 again sets the transition prohibition state when the buckle switch 5 detects that the buckle 95e and the tongue plate 95d are engaged. Therefore, the occupant determination portion 61 is prohibited from transiting the determination result of the occupant type again.

(Configuration and Function of Occupant Protection ECU and Occupant Protection Apparatus)

The occupant protection ECU 7 is connected with the occupant detection ECU 6. The occupant protection ECU 7 is a control apparatus which is provided with an input-and-output apparatus, CPU, RAM, or the like, as similar to the occupant detection ECU 6. The occupant protection ECU 7 includes a protection apparatus control portion 71 (also referred to as a protection apparatus controller) and a collision determination portion 72. The protection apparatus control portion 71 is connected with the collision determination portion 72 and the occupant protection apparatus 8. The occupant protection apparatus 8 includes various types of airbag apparatus, a seatbelt pre-tensioner, or the like. The protection apparatus control portion 71 protects an occupant by operating the occupant protection apparatus 8 when the collision determination portion 72 has detected an occurrence of a collision of the vehicle VE.

The protection apparatus control portion 71 of the occupant protection ECU is connected with the occupant determination portion 61 of the occupant detection ECU 6. The protection apparatus control portion 71 selects an operation method of the airbag apparatus included in the occupant protection apparatus 8, based on the determination result of the occupant type, which is determined by the occupant determination portion 61. Specifically, the airbag apparatus does not deploy when it is determined that the vehicle seat 9 is vacant, or when CRS is fixed on the vehicle seat 9. The airbag apparatus deploys weakly when it is determined that the small-sized adult sets on the vehicle seat 9. In other words, the airbag apparatus is set to be a weak deployment state. The airbag apparatus deploys strongly when it is determined that the large-sized adult sets on the vehicle seat 9. In other words, the airbag apparatus is set to be a strong deployment state (referred to FIG. 4).

(Control Method of Vehicular Occupant Determination Apparatus)

A control method of the occupant determination apparatus 1 will be explained with reference to FIG. 5A to FIG. 5D. When the occupant determination apparatus 1 starts, the occupant determination portion 61 sets at S101 that the determination result of the occupant type on the vehicle seat 9 is vacant. At S102, the detected loads W1, W2, the buckle signal BSW, the acceleration GL, and the rotation speeds V1, V2, V3, V4 are inputted to, for example, the occupant detection ECU 6. After S102, at S103, the prohibition release portion 63 performs the vehicle state determination process based on the rotation speeds V1, V2, V3, V4, and determines whether the vehicle stops or not (that is, whether the vehicle is in a stop state or not). At S104, it is determined whether the present determination result of the occupant type recognized by the occupant determination portion 61 corresponds to the vacant seat. When the present determination result of the occupant type is not determined as the vacant seat (S104: NO), the processing shifts to S201 in FIG. 5B.

It is determined whether the detected positive value of the acceleration GL is equal to or greater than the left-direction acceleration threshold GLth(+), or whether the detected negative value of the acceleration GL is equal to or less than the right-direction acceleration threshold GLth(−), when the occupant determination portion 61 determines as the vacant seat at present. The occupant determination portion 61 determines the occupant type on the vehicle seat 9 at S108, when the detected positive value of the acceleration GL is less than the left-direction acceleration threshold GLth(+), or the detected negative value of the acceleration GL is greater than the right-direction acceleration threshold GLth (−). After S108, at S109, based on the present determination result of the occupant type, which has been executed, it is determined whether the determination result is required to transit. When the determination result of the occupant type is not required to transit (S109: NO), the determination result in which the vehicle seat 9 corresponds to the vacant seat is maintained (S113). By contrast, at S109, when it is determined that the determination result of the occupant type is required to transit, the determination result is transited, based on the detected load W, to the determination result which is newly determined of the occupant type (also referred to as a new determination result) from the determination result which shows the vehicle seat 9 corresponds to the vacant seat. Incidentally, the new transition destination of the determination result corresponds to any one of a case where the large-sized adult sets on the vehicle seat 9 (S110), a case where the small-sized adult sits on the vehicle seat 9 (S111), and a case where CRS is fixed on the vehicle seat 9 (S112).

At S105, it is determined whether the vehicle VE is in the stop state or not based on the determination result performed by the vehicle state determination process, when the detected positive value of the acceleration GL is equal to or greater than the left-direction acceleration threshold GLth (+) or the detected negative value of the acceleration GL is equal to or less than the right-direction acceleration threshold GLth(−). The transition prohibition portion 62 sets the transition prohibition state and the determination result of the occupant type, which is performed by the occupant determination portion 61, is prohibited to transit, when it is determined that the vehicle VE is not in the stop state. Therefore, the determination result that the vehicle seat 9 corresponds to the vacant seat is maintained (S113).

By contrast, the processing shifts to S107 when it is determined at S106 that the vehicle VE is in the stop state. At S107, it is determined whether the buckle switch 5 turns on or not, that is, whether the buckle 95e and the tongue plate 95d in the seatbelt apparatus 95 are engaged. The processing shifts to S113 when it is determined that the buckle switch 5 turns on. At S113, the transition prohibition portion 62 prohibits the determination result of the occupant type by the occupant determination portion 61 from transiting again, and the determination result that the vehicle seat 9 is vacant maintains. The prohibition release state is set at S108 when it is determined that the buckle switch 5 is not in the on state. At S108, the occupant determination portion 61 determines the occupant type on the vehicle seat 9. Incidentally, at S106, at the time when it is determined that the vehicle VE is in the stop state, the prohibition release portion 63 sets the prohibition release state in which the transition prohibition state is released.

At S104, when the present determination result of the occupant type, which is recognized by the occupant determination portion 61, is not determined as the vacant seat (S104: NO), the processing shifts to S201. At S201, it is determined whether the large-sized adult sits on the vehicle seat 9. When it is determined that the large-sized adult sits on the vehicle seat 9 at present, the determination of the occupant type is executed according to the flowchart illustrated in FIG. 5B as similar to the above case.

At S201, when the present determination result of the occupant type, which is recognized by the occupant determination portion 61, is not determined that the large-sized adult sits on the vehicle seat 9 (S201: NO), the processing shifts to S301 illustrated in FIG. 5C. At S301, it is determined whether the present determination result of the occupant type recognized by the occupant determination portion 61 is a case where the small-sized adult sits on the vehicle seat 9. When it is determined that the small-sized adult sits on the vehicle seat 9, the occupant type is determined according to the flowchart illustrated in FIG. 5C as similar to the above case.

Figure 5A:
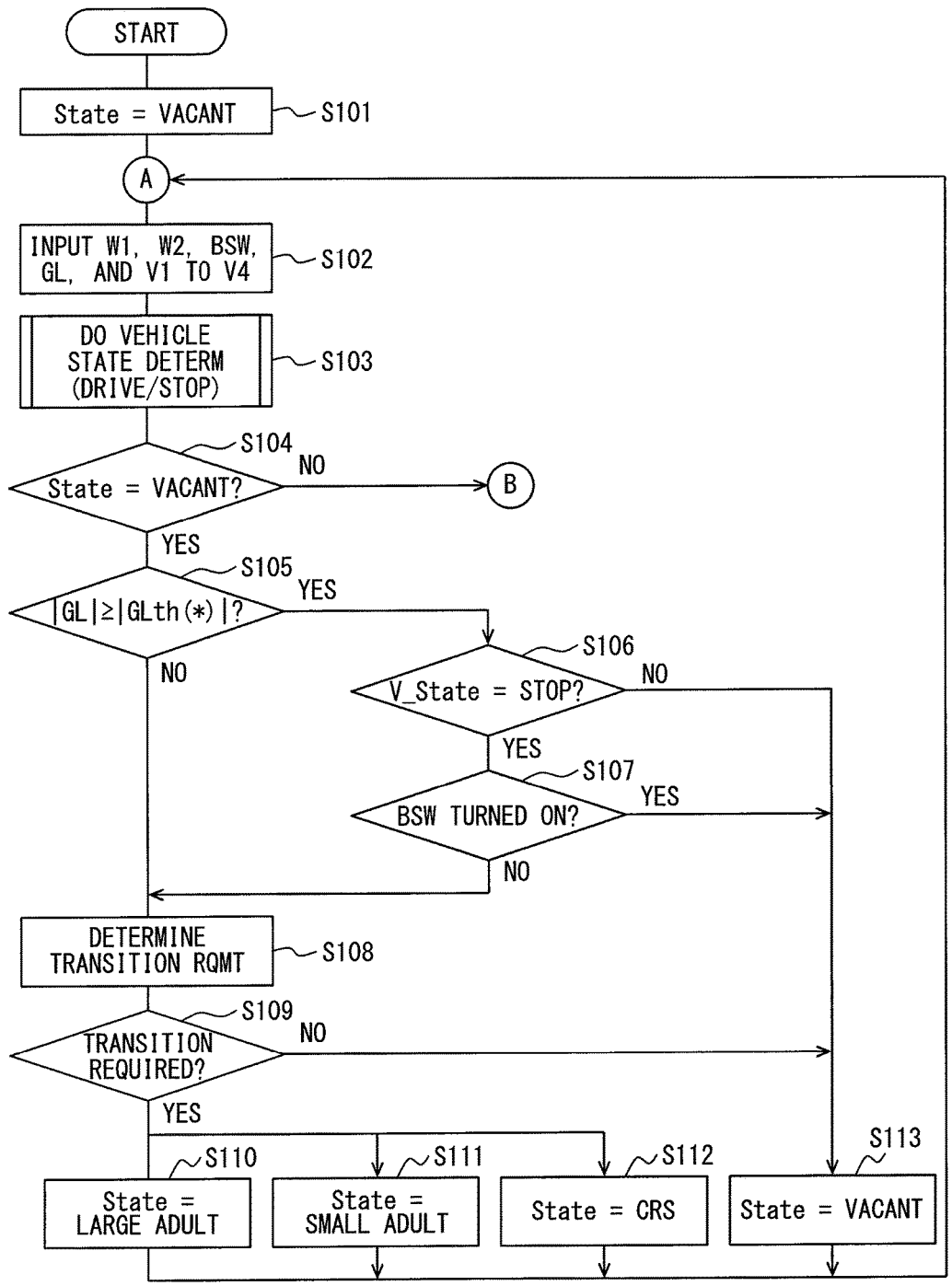
FIG. 5A is a control flowchart of the vehicular occupant determination apparatus and including a type determination flowchart at the time when a present determination result corresponds to be vacant.
Figure 5B:
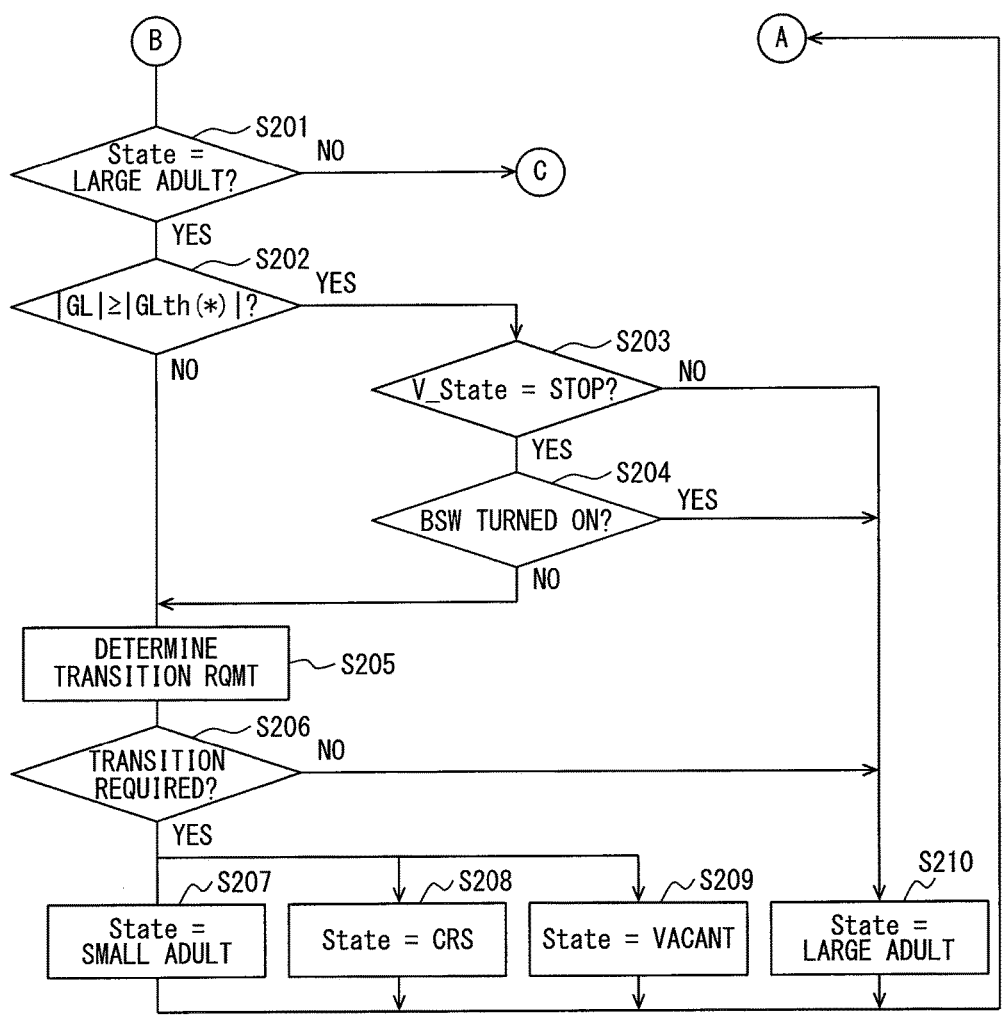
FIG. 5B is a diagram illustrating a type determination flowchart at the time when the present determination result corresponds to a large-sized adult.
Figure 5C:
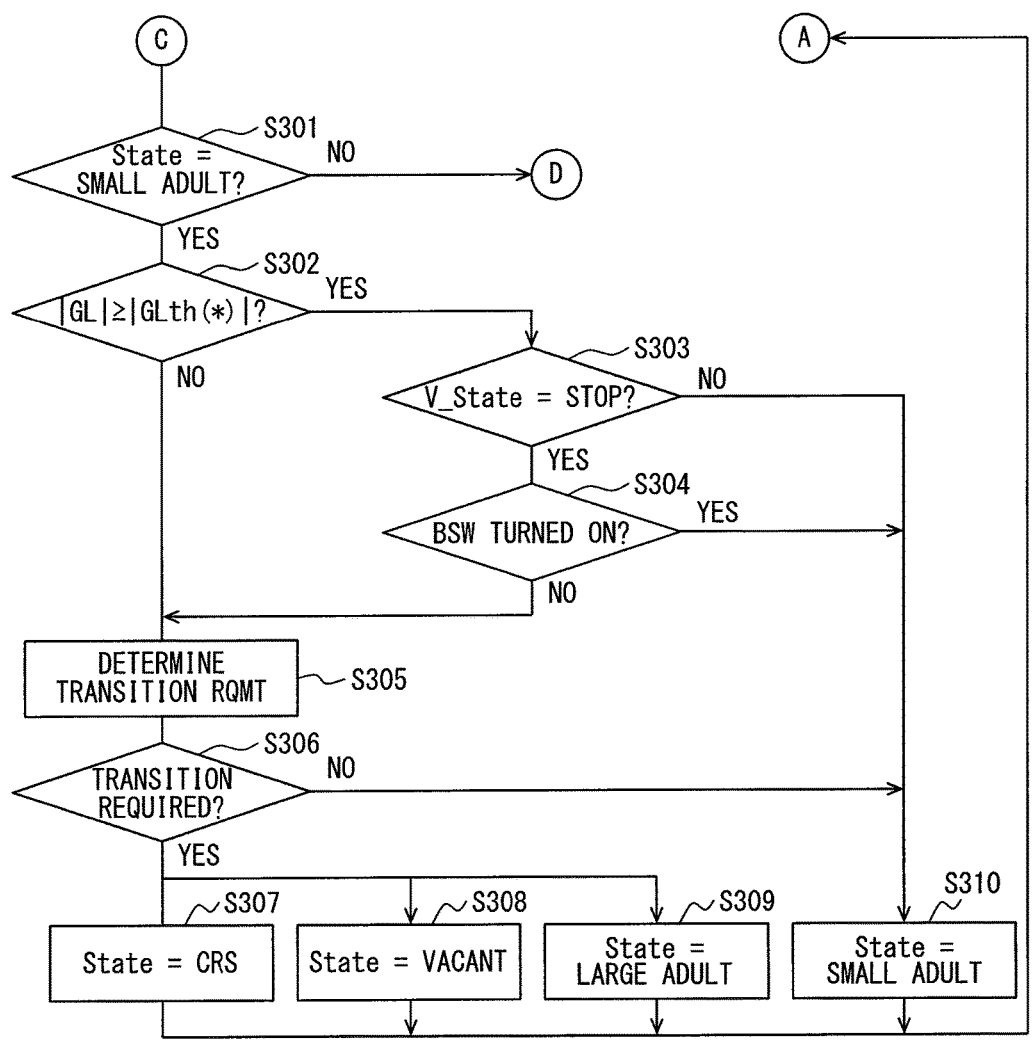
FIG. 5C is a diagram illustrating a type determination flowchart at the time when the present determination result corresponds to a small-sized adult.
Figure 5D:
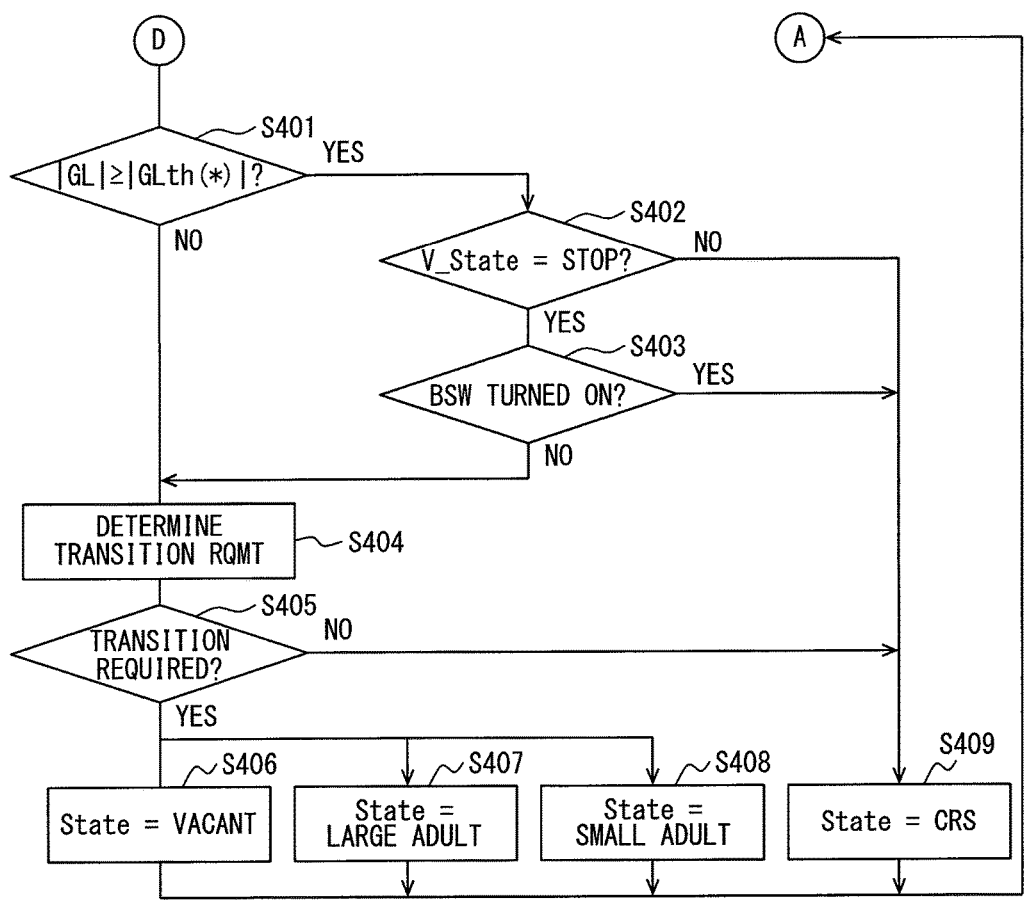
FIG. 5D is a diagram illustrating a type determination flowchart at the time when the present determination result corresponds to a CRS fixed state.

At S301, when the present determination result of the type of the occupant, which is recognized by the occupant determination portion 61, is not determined that the small-sized adult sits on the vehicle seat 9, the processing shifts to S401 illustrated in FIG. 5D. When the present determination result of the type of the occupant, which is recognized by the occupant determination portion 61, corresponds to the case where CRS is fixed on the vehicle seat 9, the occupant type illustrated in a flowchart of FIG. 5D is determined as similar to the above case.

The flowchart illustrated in FIG. 5B to 5D is substantially similar to the flowchart illustrated in FIG. 5A, and further explanation will be omitted.

(Processing Method of Vehicle State Determination Process)

Figure 5E:
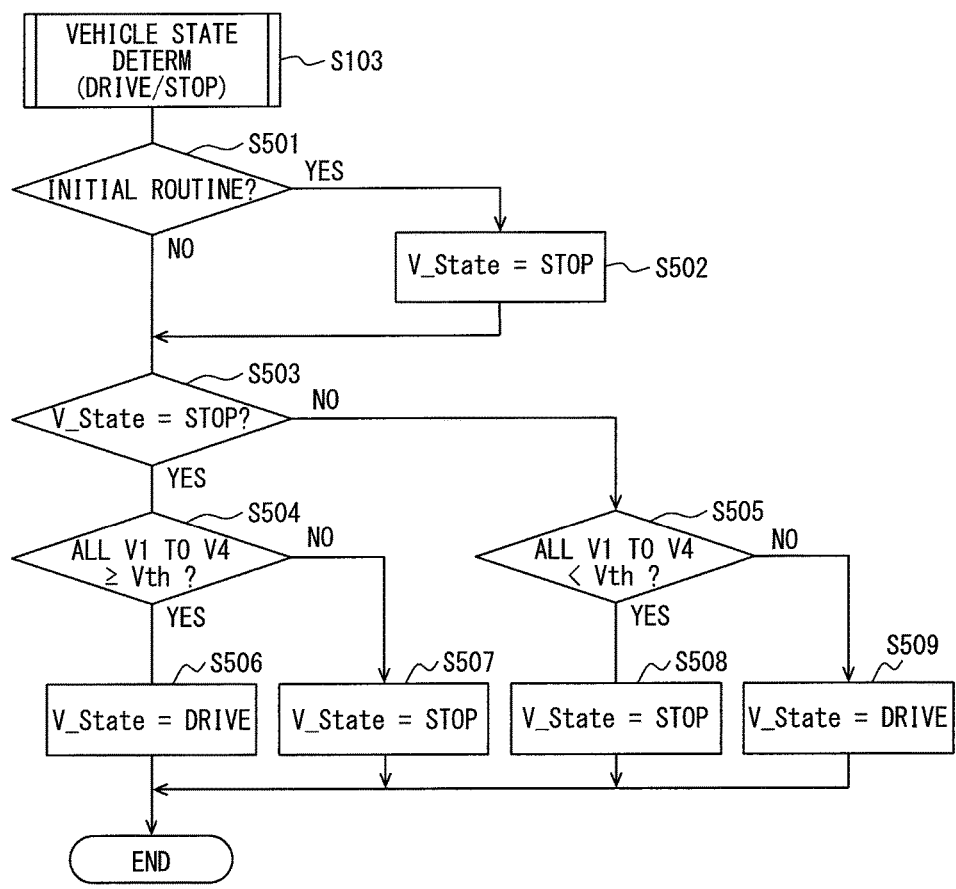
FIG. 5E is a flowchart of a vehicle state determination process illustrated in FIG. 5A.

The vehicle state determination process (corresponding to S103) performed by the prohibition release portion 63 will be explained with reference to FIG. 5E. At S501, it is determined whether this routine at this time corresponds to an initial routine. The initial routine may represent a routine performed at the first time. The prohibition release portion 63 determines at S502 that the vehicle VE is in the stop state, when it is determined that the routine corresponds to the initial routine. After S502, it is determined at S503 whether the present determination result of the vehicle state determination corresponds to the stop state of the vehicle VE. When it is determined that the routine at this time is not the initial routine (S501: NO), the processing shifts to S503 without setting the vehicle VE to the stop state.

When at S503 it is determined that the present determination result of the vehicle state determination corresponds to the stop state of the vehicle VE, the processing shifts to S504. At S504, it is determined whether all of the detected rotation speeds V1, V2, V3, V4 of the four wheels are equal to or greater than a predetermined wheel speed threshold Vth. When all of the rotation speeds V1, V2, V3, V4 are equal to or greater than the wheel speed threshold (S504: YES), it is determined at S506 that the vehicle VE starts to drive. By contrast, when it is detected that at least one of the rotation speeds V1, V2, V3, V4 is less than the wheel speed threshold (S504: NO), it is determined at S507 that the vehicle VE maintains the stop state. Incidentally, the wheel speed threshold Vth corresponds to a predetermined value which is very close to zero.

By contrast, when at S503 it is determined that the present determination result of the vehicle state determination does not correspond to the stop state of the vehicle VE, the processing shifts to S505. At S505, it is determined whether all of the detected rotation speeds V1, V2, V3, V4 of the four wheels are less than a predetermined wheel speed threshold Vth. When all of the rotation speeds V1, V2, V3, V4 are less than the wheel speed threshold, it is determined at S508 that the vehicle VE is in the stop state. By contrast, when it is detected that at least one of the rotation speeds V1, V2, V3, V4 is equal to or greater than the wheel speed threshold, it is determined at S509 that the vehicle VE maintains the drive state.

In the present embodiment, it is determined that the vehicle VE is in the drive state when any abnormality is detected in any one of the wheel speed sensors 4FR, 4FL, 4RR, 4RL. And, the determination result of the occupant type by the occupant detection ECU 6 maintains. Accordingly, it may be possible to prohibit the transition of the determination result of the occupant type when the detected positive value of the acceleration GL is equal to or greater than the left-direction acceleration threshold GLth(+) at the time of the abnormality detection or when the detected negative value of the acceleration GL is equal to or less than the right-direction acceleration threshold GLth(−) at the time of the abnormality detection. Therefore, it may be possible to prevent the determination result from being greatly different from the actual occupant type.

According to the present embodiment, the transition prohibition portion 62 is provided, and sets the transition prohibition state when the detected positive value of the acceleration GL is equal to or greater than the left-direction acceleration threshold GLth(+) or when the detected negative value of the acceleration GL is equal to or less than the right-direction acceleration threshold GLth(−). In the transition prohibition state, the transition prohibition portion 62 prohibits the occupant determination portion 61 from transiting the determination result of the occupant type. Accordingly, since the transition prohibition portion 62 sets the transition prohibition state in turning driving of the vehicle VE, it may be possible to prevent an erroneous determination in which the occupant type has changed, even when the position or the posture of the occupant BH has changed on the vehicle seat 9. It is supposed that the positive value of the acceleration GL, which is detected by the acceleration sensor 3, is equal to or greater than the left-direction acceleration threshold GLth(+) or when the detected negative value of the acceleration GL is equal to or less than the right-direction acceleration threshold GLth(−). In this case, when it is detected that the vehicle VE stops, the prohibition release portion 63 releases the transition prohibition state. Accordingly, the prohibition release portion 63 releases the transition prohibition state when the vehicle VE stops inclined in the vehicle width direction. Thus, it may be possible to detect the change of the occupant type and to prevent the determination result from being greatly different from the actual occupant type, when the occupant sits on or leaves the vehicle seat 9.

In this case, the occupant type on the vehicle seat 9 may not be determined exactly since the vehicle VE is inclined in the vehicle width direction. However, it may be possible to determine that a small-sized adult sit on a vehicle seat when a large-sized adult sits on the vehicle seat, so that it may be possible to determine the occupant type which is adjacent to a proper occupant type. An airbag apparatus deploys in both of a case where it is determined that the large-sized adult sits on the vehicle seat and another case where it is determined the small-sized adult sits on the vehicle seat. Thus, there may be no difficult in an operation of the occupant protection apparatus 8.

Furthermore, it may possible to properly transit the determination result of the occupant type only with the acceleration sensor 3 and the wheel speed sensors 4FR, 4FL, 4RR, 4RL. That is, it may be unnecessary to provide a special detection device such as a yaw rate sensor or the like. It may be possible to provide the occupant determination apparatus 1 with a simple configuration at a low cost.

The transition prohibition portion 62 again prohibits the determination result of the occupant type from transiting when the buckle switch 5 detects that the buckle 95e and the tongue plate 95d in the seatbelt apparatus 95 are engaged to each other during the prohibition release state. Accordingly, it is supposed that the vehicle VE stops inclined in the vehicle width direction. In this case, the determination result of the occupant type does not transit according to the detection that the buckle 95e and the tongue plate 95d are engaged to each other, even when the detected load W decreases. Thus, for example, it may be possible to prevent a determination that the vehicle seat 9 is vacant although the large-sized adult sits on the vehicle seat 9.

The wheel speed sensors 4FR, 4FL, 4RR, 4RL, which are attached to the four wheels of the vehicle VE respectively, are used as the drive state detection portion. Accordingly, it may be possible that the occupant determination apparatus 1 uses a wheel speed sensor included in an anti-lock braking system (ABS) apparatus or the like in the vehicle VE. It may be possible to detect an abnormality detection of the wheel speed sensors 4FR, 4FL, 4RR, 4RL, by using a diagnostic function of the ABS apparatus.

The prohibition release portion 63 detects that the vehicle VE drives when all of the rotation speeds V1, V2, V3, V4 of the four wheels are equal to or greater than the predetermined wheel speed threshold Vth while detecting the stop of the vehicle VE. The prohibition release portion 63 detects that the vehicle VE stops when all of the rotation speeds V1, V2, V3, V4 of the four wheels are less than the predetermined wheel speed threshold Vth when having detected the drive of the vehicle VE. Accordingly, in the vehicle state determination by the prohibition release portion 63, it may be possible to precisely change the determination result from the stop state to the drive state on the vehicle VE, and to precisely change the determination result from the drive state to the stop state on the vehicle VE. Especially, when the vehicle VE is provided with an anti-lock braking system, there is no chance when all four wheels stop concurrently except for the vehicle stop. Thus, it may be possible to prevent the vehicle VE from erroneously determining the stop state.

First Modified Example

A configuration of a first modified example of the present embodiment will be explained with reference to FIG. 6. Incidentally, in the first modified example to a fourth modified example, the occupant determination apparatus 1 and the vehicle seat 9 have a configuration similar to the above embodiment. In the present modified example, the transition prohibition portion 62 does not set the transition prohibition state when the present determination result of the occupant type recognized by the occupant determination portion 61 corresponds to the vacant seat, even when the buckle switch 5 detects that the buckle 95e and the tongue plate 95d are engaged. It is not determined whether the buckle switch 5 turn on or not, when it is determined at S606 that the vehicle VE is in the stop state. In this case, the prohibition release portion 63 sets the prohibition release state in which the transition prohibition state is released, and the occupant determination portion 61 determines the occupant type on the vehicle seat 9 (S607).

Figure 6:
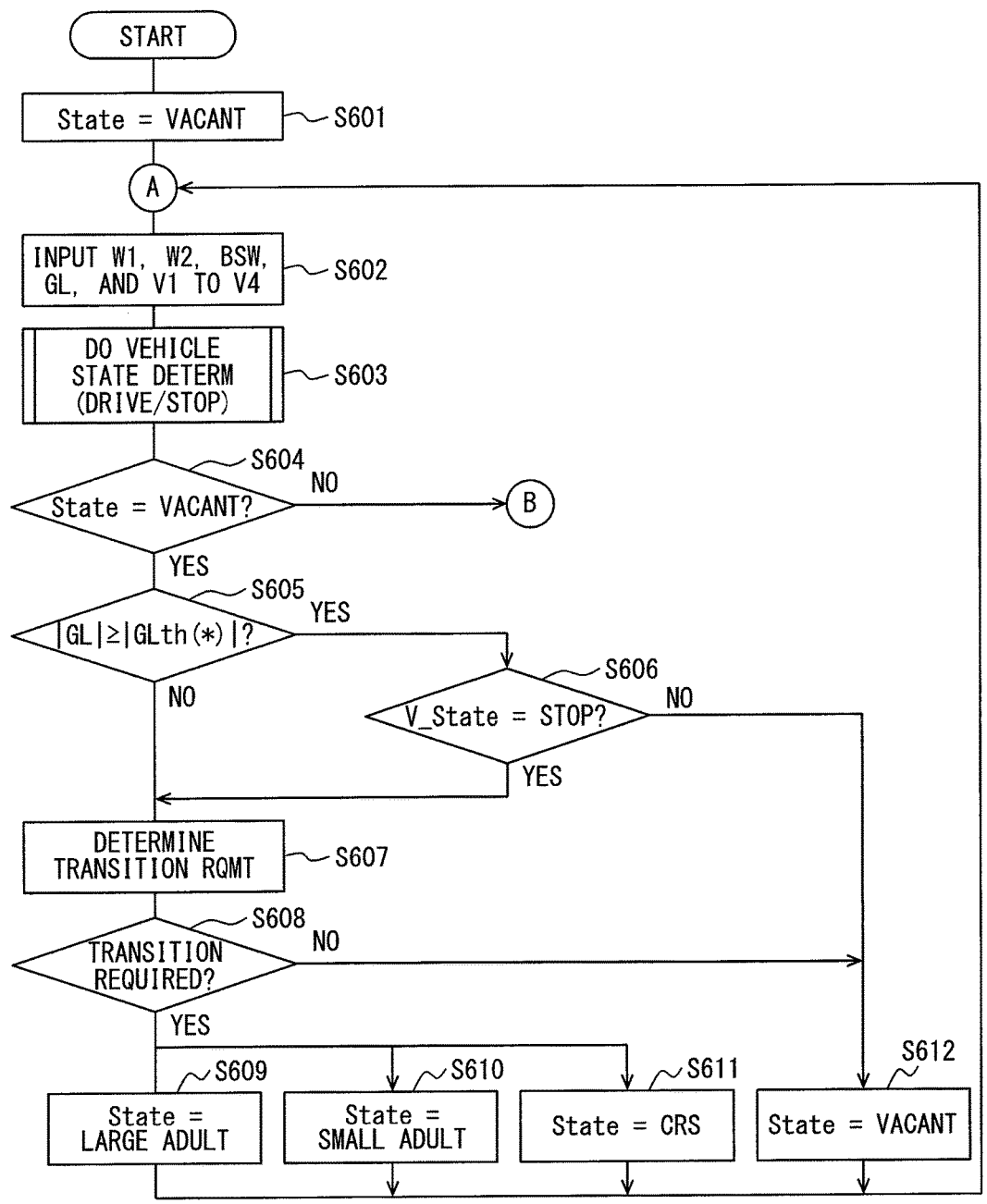
FIG. 6 is a flowchart showing a part of the type determination flowchart of a first modified example of the embodiment.

In the flowchart illustrated in FIG. 6, steps except for the above steps is substantially similar to the steps illustrated in FIG. 5A, and thus, further explanation will be omitted. In the present modified example, when the present determination result of the occupant type shows that the large-sized adult sits on the vehicle seat, a control of the occupant determination apparatus 1 is executed according to a flowchart illustrated in FIG. 5B as similar to the above described case. In the present modified example, when the present determination result of the occupant type shows that the small-sized adult sits on the vehicle seat, a control of the occupant determination apparatus 1 is executed according to a flowchart illustrated in FIG. 5C as similar to the above described case. Further, in the present modified example, when the present determination result of the occupant type shows that CRS is fixed on the vehicle seat, a control of the occupant determination apparatus 1 is executed according to a flowchart illustrated in FIG. 5D as similar to the above described case.

According to the present modified example, the transition prohibition portion 62 does not set the transition prohibition state when the present determination result of the occupant type recognized by the occupant determination portion 61 corresponds to the vacant seat, even when the buckle switch 5 detects that the buckle 95e and the tongue plate 95d are engaged to each other. When the vehicle seat 9 is vacant and the tongue plate 95d is engaged with the buckle 95e, an occupant can sit on the vehicle seat 9. Thus, according to the present modified example, it may be possible to suitably transit the determination result of the occupant type on the vehicle seat 9.

In the present modified example, it is supposed that it is determined that CRS is fixed on the vehicle seat when the vehicle seat 9 is actually vacant. In this case, no difficulty occurs in operation of the airbag apparatus since the airbag apparatus does not deploy in both cases including the vacant seat state and the CRS fixed state. Incidentally, it may be referred that the vacant state and the CRS fixed state are adjacent to each other with respect to the determination result.

Second Modified Example

A configuration of a second modified example of the present embodiment will be explained with reference to FIG. 7. In this example, it is supposed that the present determination result of the occupant type recognized by the occupant determination portion 61 corresponds to a case where the large-sized adult sits on the vehicle seat. In the present modified example, the transition prohibition portion 62 does not set the transition prohibition state when the determination result of the occupant type of the transition destination corresponds to a case other than the vacant seat, even when the buckle 95e and the tongue plate 95d are engaged to each other. Therefore, in the flowchart of FIG. 7, the transition requirement determination (S205) illustrated in the flowchart of FIG. 5B is performed at S705 immediately after S704. At S704, it is determined whether the present determination result of the occupant type recognized by the occupant determination portion 61 corresponds to the case where the large-sized adult sits on the vehicle seat. In other words, at S704, it is determined whether the present determination result of the occupant type corresponds to the large-sized adult.

When it is determined at S707 that the vehicle VE is in the stop state, the processing shifts to S708. At S708, it is determined whether the determination result is required to transit to the vacant seat, based on the determination result of the occupant type, which has been executed in this time. When it is unnecessary to transit the determination result of the occupant type to the vacant seat, the processing shifts to S710 without determining whether the buckle switch 5 turns on or not. By contrast, when it is determined at S708 that it is necessary to transit the determination result of the occupant type to the vacant seat, the processing shifts to S709. At S709, it is determined whether the buckle switch 5 turns on or not.

Figure 7:
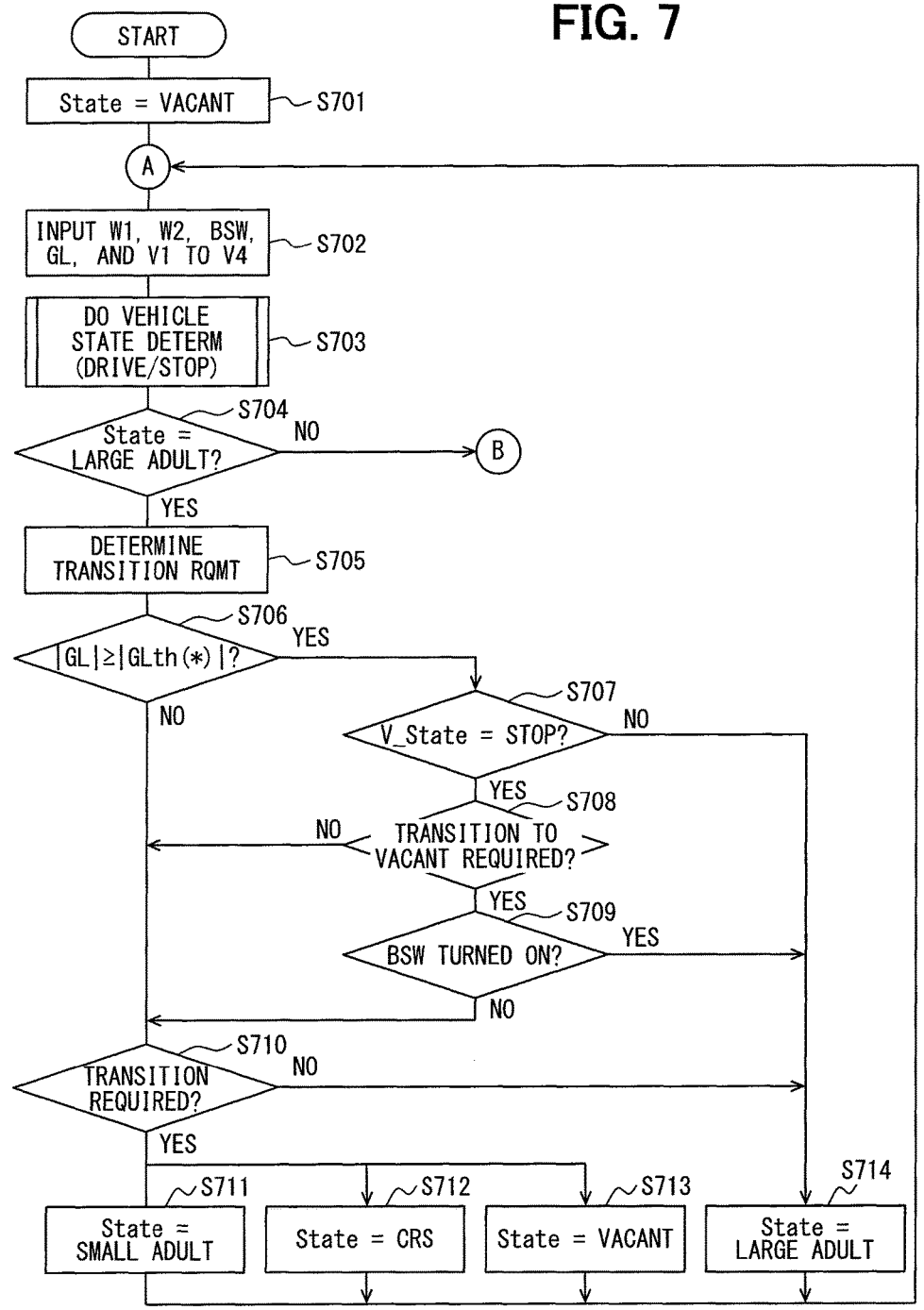
FIG. 7 is a flowchart showing a part of the type determination flowchart of a second modified example.

In the flowchart illustrated in FIG. 7, steps other than the above described steps are substantially similar to the steps illustrated in FIG. 5B, and thus, further explanation will be omitted. In the present modified example, when the present determination result of the occupant type, which is recognized by the occupant determination portion 61, shows that the small-sized adult sits on the vehicle seat, a control of the occupant determination apparatus 1 is executed according to a flowchart in which steps of FIG. 5C are changed as similar to the above described case. In the present modified example, when the present determination result of the occupant type shows that CRS is fixed on the vehicle seat, a control of the occupant determination apparatus 1 is executed according to a flowchart in which the steps of FIG. 5D are changed as similar to the above described case. In the present modified example, when the present determination result of the occupant type shows the vacant seat, a control of the occupant determination apparatus 1 is executed according to a flowchart in which the steps of FIG. 5A are changed as similar to the above described case.

According to the present modified example, the transition prohibition portion 62 does not set the transition prohibition state when the determination result of the occupant type of the transition destination corresponds to a case other than the vacant seat, even when the buckle 95e and the tongue plate 95d are engaged to each other. Accordingly, it may be possible to properly transit the determination result of the occupant type on the vehicle seat 9 when the determination result of the occupant type of the transition destination corresponds to a case other than the vacant seat. By contrast, it is supposed that the transition prohibition state is not set when the determination result of the occupant type of the transition destination is the vacant seat. In this case, the determination result of the occupant type may transit to the vacant seat due to reduction of the load W which has been caused by tilt of the vehicle seat 9. Thus, the determination result of the occupant type may be greatly different from the actual occupant type on the vehicle seat 9. In order to prevent this difficulty, in the present modified example, the transition prohibition portion 62 does not set the transition prohibition state when the determination result of the occupant type of the transition destination corresponds to a case other than the vacant seat, even when the buckle 95e and the tongue plate 95d are engaged to each other.

Third Modified Example

A configuration of a third modified example of the present embodiment will be explained with reference to FIG. 8. In the present example, it is supposed that the present determination result of the occupant type corresponds to a case where the small-sized adult sits on the vehicle seat. In the present modified example, the transition prohibition portion 62 does not set the transition prohibition state when the detected load W at the time when the occupant type of the transition destination is determined is greater than the detected load W at the time when the present occupant type is determined, even when the buckle switch 5 detects that the buckle 95e and the tongue plate 95d are engaged to each other. Therefore, in the flowchart of FIG. 8, the transition requirement determination (S305) illustrated in the flowchart of FIG. 5C is performed at S805 immediately after S804. At S804, it is determined whether the present determination result of the occupant type corresponds to the case where the small-sized adult sits on the vehicle seat. In other words, at S804, it is determined whether the present determination result of the occupant type corresponds to the small-sized adult.

When it is determined at S807 that the vehicle VE is in the stop state, the processing shifts to S808. At S808, it is determined whether the detected load W at the time when the occupant type of the transition destination is determined is greater than the detected load W at the time when the present occupant type is determined. In other words, at S808, it is determined whether the determination result of the occupant type at this time is required to transit to a greater weight side. Incidentally, the determination result of the occupant type at this time has the identical meaning of the determination result of the occupant type of the transition destination. When it is necessary that the determination result of the occupant type transits to a determination result being the greater weight side, the processing shifts to S810 without determining whether the buckle switch 5 turns on or not. By contrast, when it is determined at S808 that it is unnecessary to transit the determination result of the occupant type to the determination result which is the greater weight side, the processing shifts to S809. At S809, it is determined whether the buckle switch 5 turns on or not.

Figure 8:
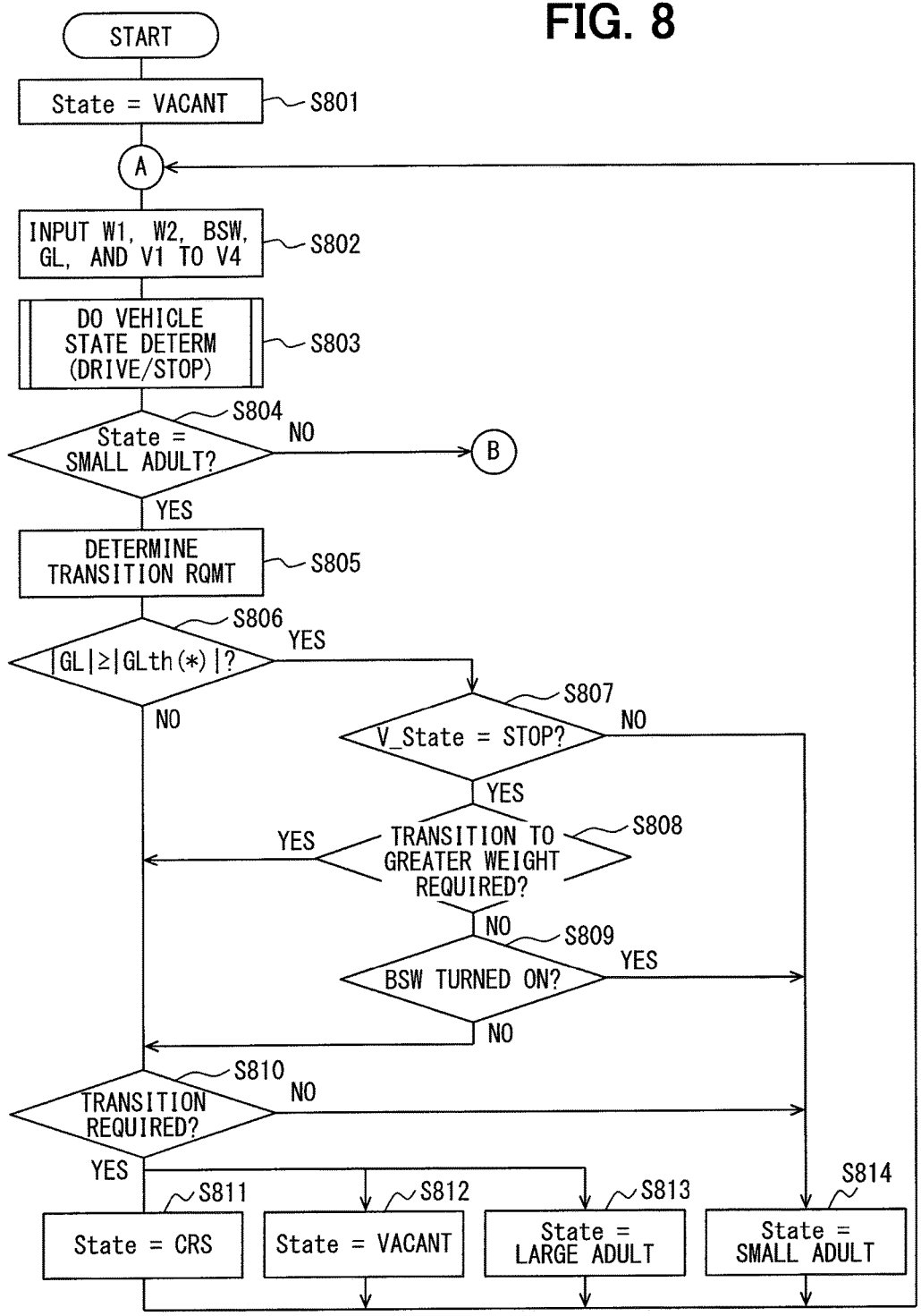
FIG. 8 is a flowchart showing a part of the type determination flowchart of a third modified example.

In the flowchart illustrated in FIG. 8, steps other than the above described steps are substantially similar to the steps illustrated in FIG. 5C, and thus, further explanation will be omitted. In the present modified example, when the present determination result of the occupant type shows that CRS is fixed on the vehicle seat, a control of the occupant determination apparatus 1 is executed according to a flowchart in which the steps of FIG. 5D are changed as similar to the above described case. In the present modified example, when the present determination result of the occupant type shows the vacant seat, a control of the occupant determination apparatus 1 is executed according to a flowchart in which the steps of FIG. 5A are changed as similar to the above described case. In the present modified example, when the present determination result of the occupant type shows that the large-sized adult sits on the vehicle seat, a control of the occupant determination apparatus 1 is executed according to a flowchart in which the steps of FIG. 5B are changed as similar to the above described case.

According to the present modified example, the transition prohibition portion 62 does not set the transition prohibition state when the determination result of the occupant type at this time corresponds to a case where the determination result is required to transit to the greater weight side, even when the buckle switch 5 detects that the buckle 95e and the tongue plate 95d are engaged to each other. Incidentally, there is a following design concept of the occupant determination apparatus 1: the determination result of the occupant type is transited to the greater weight side so that the airbag apparatus is likely to be deployed, when the occupant type is not determined exactly due to tilt of the vehicle seat 9. The present modified example satisfies the above design concept.

Fourth Modified Example

A configuration of a fourth modified example of the present embodiment will be explained with reference to FIG. 9. In the present example, it is supposed that the present determination result of the occupant type corresponds to a case where the small-sized adult sits on the vehicle seat. In the present modified example, the transition prohibition portion 62 does not set the transition prohibition state when the detected load W at the time when the occupant type of the transition destination is determined is less than the detected load W at the time when the present occupant type is determined, even when the buckle switch 5 detects that the buckle 95e and the tongue plate 95d are engaged to each other. Therefore, in the flowchart of FIG. 9, the transition requirement determination (S305) illustrated in the flowchart of FIG. 5C is performed at S905 immediately after S904. At S904, it is determined whether the present determination result of the occupant type corresponds to the case where the small-sized adult sits on the vehicle seat. In other words, at S904, it is determined whether the present determination result of the occupant type corresponds to the small-sized adult.

When it is determined at S907 that the vehicle VE is in the stop state, the processing shifts to S908. At S908, it is determined whether the detected load W at the time when the occupant type of the transition destination is determined is less than the detected load W at the time when the present occupant type is determined. In other words, it is determined whether the determination result of the occupant type at this time is required to transit to a smaller weight side. When it is necessary that the determination result of the occupant type transits to a determination result being the smaller weight side, the processing shifts to S910 without determining whether the buckle switch 5 turns on or not. By contrast, when it is determined at S908 that it is unnecessary to transit the determination result of the occupant type to the determination result being the smaller weight side, the processing shifts to S909. At S909, it is determined whether the buckle switch 5 turns on or not.

Figure 9:
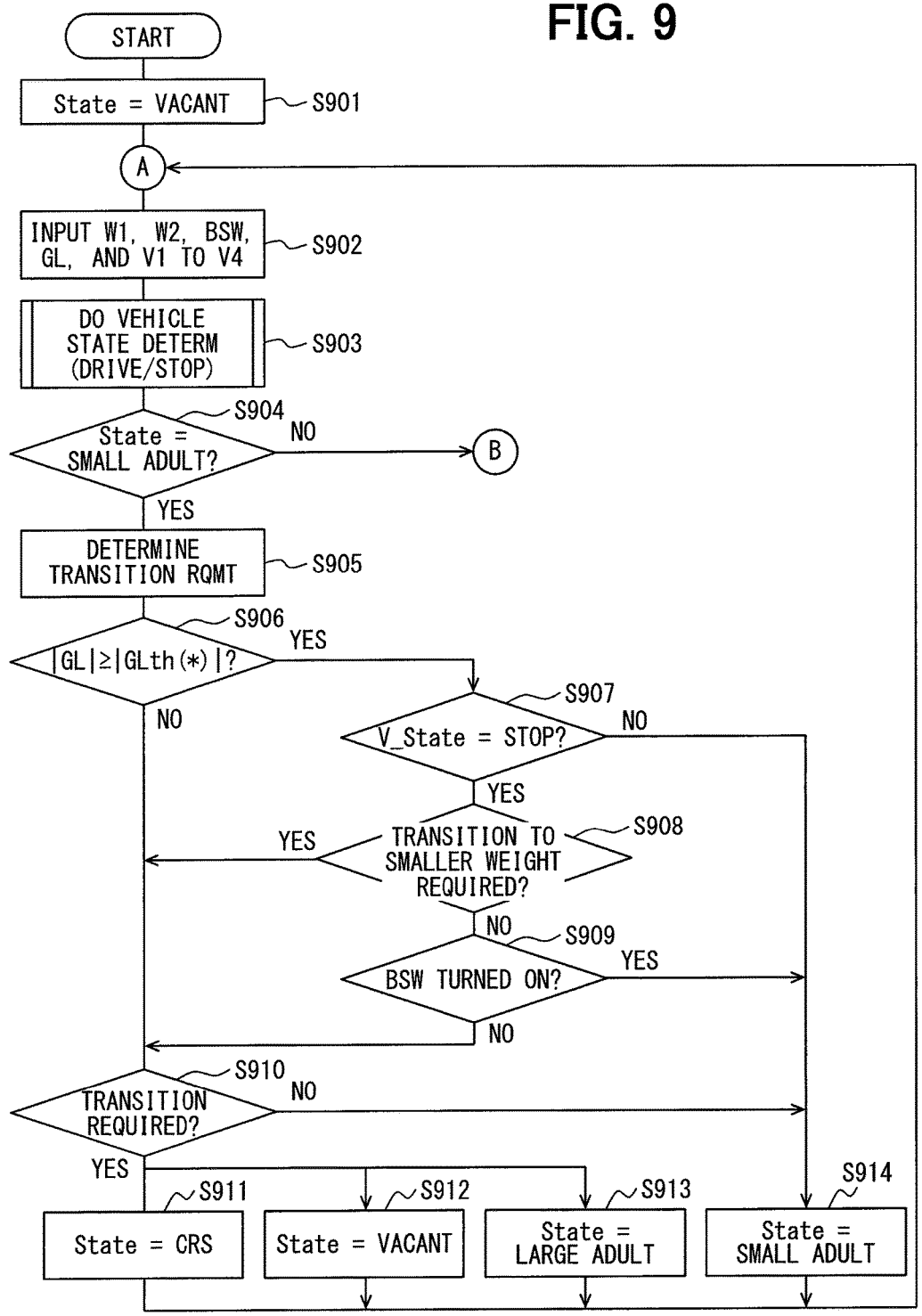
FIG. 9 is a flowchart showing a part of the type determination flowchart of a fourth modified example.

In the flowchart illustrated in FIG. 9, steps other than the above described steps are substantially similar to the steps illustrated in FIG. 5C, and thus, further explanation will be omitted. In the present modified example, when the present determination result of the occupant type shows that CRS is fixed on the vehicle seat, a control of the occupant determination apparatus 1 is executed according to a flowchart in which the steps of FIG. 5D are changed as similar to the above described case. In the present modified example, when the present determination result of the occupant type shows the vacant seat, a control of the occupant determination apparatus 1 is executed according to a flowchart in which the steps of FIG. 5A are changed as similar to the above described case. In the present modified example, when the present determination result of the occupant type shows that the large-sized adult sits on the vehicle seat, a control of the occupant determination apparatus 1 is executed according to a flowchart in which steps of FIG. 5B are changed as similar to the above described case.

According to the present modified example, the transition prohibition portion 62 does not set the transition prohibition state when the determination result of the occupant type at this time requires a transition to the smaller weight side, even when the buckle switch 5 detects that the buckle 95e and the tongue plate 95d are engaged to each other. Incidentally, there is a following design concept of the occupant determination apparatus 1: the determination result of the occupant type is not transited to the smaller weight side so that the airbag apparatus is less likely to be deployed, when the occupant type is not determined exactly due to the tilt of the vehicle seat 9. The present modified example satisfies the above design concept.

As described above, in the first modified example to the fourth modified example, the transition prohibition portion 62 determines whether the transition prohibition state is set again based on the determination result of the occupant type at this time or the determination result of the occupant type of the transition destination. Accordingly, it may be possible to provide flexibility with respect to whether the determination result of the occupant type is transited. It may be possible to prevent the determination result of the occupant Other Embodiment The present disclosure is not limited to the above described embodiment, and may be modified or expanded as follows, for example.

A case where the occupant determination apparatus 1 detects that the vehicle VE stops may include a case where the vehicle VE drives at a speed which is substantially considered the stop, not only a case where the vehicle VE completely stops. In other words, the stop of the vehicle VE may include a case where the vehicle VE stops substantially.

Any number of the load sensor 2FL, 2RL provided to the vehicle seat 9 may be possible. As long as the load sensor 2FL, 2RL is provided to either of the right part or the left part of the seat cushion 91, an attachment position of the load sensor 2FL, 2RL may be determined according to a condition or appropriately.

In the vehicle seat 9, another load sensor which is not used for the determination of the occupant type may be provided at a side in a left and right direction opposite to the load sensor 2FL, 2RL in the vehicle seat 9, the load sensor 2FL, 2RL being used for determining the occupant type.

The occupant detection ECU 6 may be integrally formed with the occupant protection ECU 7. In forming integrally them, the acceleration sensor 3 may be used as an acceleration sensor which detects a collision and is provided to the occupant protection ECU 7.

An acceleration sensor 3 detecting the left-direction acceleration and an acceleration sensor 3 detecting the right-direction acceleration may be separately provided in the vehicle VE. Based on which of the acceleration sensor 3 detects the acceleration GL, a direction of the acceleration GL may be determined. In this case, both of the left-direction acceleration GL and the right-direction acceleration GL are positive values, and each of the transition prohibition state and the transition permission state is set when either of the accelerations GL is equal to or greater than an acceleration threshold.

A camera device which images a vehicle cabin may be provided as a seatbelt wearing detection device, instead of the buckle switch 5.

All or a part of functions executed by the occupant detection ECU 6 may be configured by, for example, one or multiple integrated circuits (ICs) or the like in a hardware manner.

The occupant determination apparatus 1 of the present disclosure may be applied to a warning apparatus which alerts an occupant at the time when the seatbelt apparatus 95 is not worn.

Incidentally, the large-sized adult may be a male, which can be represented in testing by a AM50 (including Hybrid III 50th) dummy or may be a person having a body weight of an American male adult positioned at 50% of the population (that is, an average body weight) in the normal distribution of the body weights of American male adults, for example. The small-sized adult may be a female, which can be represented in testing by a AF05 (including Hybrid III 5th) dummy or may be a person having a body weight of an American female adult positioned at 5% of a population from the lightest weight side in the normal distribution of the body weights of American female adults, for example. It should be noticed that the large-sized adult and the small-sized adult may be defined arbitrarily.

It is noted that a flowchart or the process of the flowchart in the present application includes steps (also referred to as sections), each of which is represented, for instance, as S101. Further, each step can be divided into several sub-steps while several steps can be combined into a single step.

While the embodiments, the configurations, the aspects of the vehicular occupant determination apparatus have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A vehicular occupant determination apparatus comprising:
   a load detection portion that detects a load of either a left part or a right part of a seat portion of a vehicle seat in a vehicle;
   an occupant determination portion, provided in at least one ECU, that determines any one of occupant types on the vehicle seat based on the load detected by the load detection portion, and maintains or transits a determination result of the occupant types;
   an acceleration detection portion that detects an acceleration in a width direction of the vehicle, the acceleration being generated in the vehicle;
   a transition prohibition portion, provided in the at least one ECU, that prohibits a transition of the determination result of the occupant types in a transition prohibition state;
   a drive state detection portion that detects a drive state of the vehicle to generate a detection value;

a prohibition release portion, provided in the at least one ECU, that releases the transition prohibition state so as to enable the transition of the determination result: and
a buckle switch that detects a wearing of a seatbelt by an occupant, wherein:
the at least one ECU determines whether the acceleration in the width direction is greater than a predetermined acceleration threshold,
the at least one ECU also determines whether the vehicle is driving based on the detection value from the drive state detection portion,
the at least one ECU further also determines whether the wearing of the seatbelt is performed based on a signal from the buckle switch, and
the prohibition release portion permits the determination result to transit in response to a determination that the acceleration in the width direction is greater than the predetermined acceleration threshold, a determination that the vehicle stops and a determination that the seatbelt is not worn.

2. The vehicular occupant determination apparatus according to claim 1, wherein:
the transition prohibition portion determines whether the transition prohibition state is set again based on a present determination result of the occupant types or on the determination result of the occupant types of a transition destination.

3. The vehicular occupant determination apparatus according to claim 2, wherein:
the transition prohibition portion does not set the transition prohibition state when the present determination result of the occupant types corresponds to a vacant seat, even when the wearing of the seatbelt apparatus is detected, the vacant seat showing that the vehicle seat is vacant.

4. The vehicular occupant determination apparatus according to claim 2, wherein:
the transition prohibition portion does not set the transition prohibition state when the determination result of the occupant types of the transition destination corresponds to a case other than a vacant seat, even when the wearing of the seatbelt apparatus is detected.

5. The vehicular occupant determination apparatus according to claim 2, wherein:
the transition prohibition portion does not set the transition prohibition state when the load at a time when the occupant type of the transition destination is determined is greater than the load at a time when the present occupant type is determined, even when the wearing of the seatbelt apparatus is detected.

6. The vehicular occupant determination apparatus according to claim 2, wherein:
the transition prohibition portion does not set the transition prohibition state when the load at a time when the occupant type of the transition destination is determined is less than the load at a time when the present occupant type is determined, even when the wearing of the seatbelt apparatus is detected.

7. The vehicular occupant determination apparatus according to claim 1, wherein:
the vehicle has four wheels;
the drive state detection portion includes wheel speed sensors; and
each of the wheel speed sensors is attached to each of the four wheels.

8. The vehicular occupant determination apparatus according to claim 7, wherein:
the prohibition release portion detects that the vehicle drives when the wheel speed sensors detect that all wheel speeds of the four wheels are equal to or greater than a predetermined wheel speed threshold while a stop of the vehicle is detected; and
the prohibition release portion detects that the vehicle is stopped when the wheel speed sensors detect that all of the wheel speeds of the four wheels are less than the wheel speed threshold while drive of the vehicle is detected.

9. The vehicular occupant determination apparatus according to claim 4, wherein:
the vehicle has four wheels;
the drive state detection portion includes wheel speed sensors;
each of the wheel speed sensors is attached to each of the four wheels;
the prohibition release portion detects that the vehicle drives when the wheel speed sensors detect that all wheel speeds of the four wheels are equal to or greater than a predetermined wheel speed threshold while a stop of the vehicle is detected; and
the prohibition release portion detects that the vehicle is stopped when the wheel speed sensors detect that all of the wheel speeds of the four wheels are less than the wheel speed threshold while drive of the vehicle is detected.

10. The vehicular occupant determination apparatus according to claim 5, wherein:
the vehicle has four wheels;
the drive state detection portion includes wheel speed sensors;
each of the wheel speed sensors is attached to each of the four wheels;
the prohibition release portion detects that the vehicle drives when the wheel speed sensors detect that all wheel speeds of the four wheels are equal to or greater than a predetermined wheel speed threshold while a stop of the vehicle is detected; and
the prohibition release portion detects that the vehicle is stopped when the wheel speed sensors detect that all of the wheel speeds of the four wheels are less than the wheel speed threshold while drive of the vehicle is detected.

11. The vehicular occupant determination apparatus according to claim 6, wherein:
the vehicle has four wheels;
the drive state detection portion includes wheel speed sensors;
each of the wheel speed sensors is attached to each of the four wheels;
the prohibition release portion detects that the vehicle drives when the wheel speed sensors detect that all wheel speeds of the four wheels are equal to or greater than a predetermined wheel speed threshold while a stop of the vehicle is detected; and
the prohibition release portion detects that the vehicle is stopped when the wheel speed sensors detect that all of the wheel speeds of the four wheels are less than the wheel speed threshold while drive of the vehicle is detected.

12. The vehicular occupant determination apparatus according to claim 3, wherein:

the occupant determination portion outputs the determination result of the occupant types to a protection apparatus controller that controls a protection apparatus; and the occupant types include an adult, a child restraint system, and the vacant seat.

13. A vehicular occupant determination apparatus comprising:

a load detection sensor that detects a load of either a left part or a right part of a seat portion of a vehicle seat in a vehicle;

a buckle switch that detects an engagement of a tongue plate and a buckle so as to detect a wearing of a seatbelt;

an acceleration detection sensor that detects an acceleration in a width direction of the vehicle, the acceleration being generated in the vehicle; and an ECU that includes an occupant determination portion, a transition prohibition portion, and a prohibition release portion, wherein:

the occupant determination portion that determines any one of occupant types on the vehicle seat based on the load detected by the load detection sensor, and maintains or transits a determination result of the occupant types, the transition prohibition portion that prohibits a transition of the determination result of the occupant types, a prohibition release portion that permit the transition of the determination result even the transition prohibition portion prohibits the transition, the ECU determines whether the acceleration in the width direction is greater than a predetermined acceleration threshold, the ECU also determines whether the tongue plate and the buckle are engaged based on a signal from the buckle switch, and the prohibition release portion permits the transition of the determination result in response to that it is determined that the acceleration in the width direction is greater than the predetermined acceleration threshold and also that the tongue plate and the buckle are not engaged.

14. The vehicular occupant determination apparatus according to claim 13, wherein:

the acceleration in the width direction of the vehicle is an acceleration generated when the vehicle stops on a road inclined in a vehicle width direction.

* * * * *